United States Patent
Schmidt et al.

(10) Patent No.: US 12,056,587 B2
(45) Date of Patent: *Aug. 6, 2024

(54) META-AUTOMATED MACHINE LEARNING WITH IMPROVED MULTI-ARMED BANDIT ALGORITHM FOR SELECTING AND TUNING A MACHINE LEARNING ALGORITHM

(71) Applicant: NEC Corporation, Tokyo (JP)

(72) Inventors: Mischa Schmidt, Heidelberg (DE); Julia Gastinger, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 18/186,307

(22) Filed: Mar. 20, 2023

(65) Prior Publication Data

US 2023/0229974 A1 Jul. 20, 2023

Related U.S. Application Data

(63) Continuation of application No. 16/831,845, filed on Mar. 27, 2020, now Pat. No. 11,645,572.

(Continued)

(51) Int. Cl.
*G06N 20/00* (2019.01)
*G06F 9/38* (2018.01)
(Continued)

(52) U.S. Cl.
CPC ............ *G06N 20/00* (2019.01); *G06F 9/3836* (2013.01); *G06F 18/217* (2023.01); *G06F 18/285* (2023.01)

(58) Field of Classification Search
None
See application file for complete search history.

(56) References Cited

U.S. PATENT DOCUMENTS 10,600,005 B2    3/2020 Gunes et al.
11,348,032 B1 *  5/2022 Van Gael .................. G06F 8/31
(Continued)

FOREIGN PATENT DOCUMENTS

AU    2018205507 A1    8/2019
CN    108009643 A      5/2018
(Continued)

OTHER PUBLICATIONS

Smith, Micah J. et al., "The Machine Learning Bazaar: Harnessing the ML Ecosystem for Effective System Development," arXiv:1905.08942v3, Nov. 12, 2019.

(Continued)

*Primary Examiner* — Toan H Vu

(57) ABSTRACT

A method for automated machine learning includes controlling execution of a plurality of instantiations of different automated machine learning frameworks on a machine learning task each as a separate arm in consideration of available computational resources and time budget. During the execution by the separate arms, a plurality of machine learning models are trained and performance scores of the plurality of trained machine learning models are computed such that one or more of the plurality of trained machine learning models are selectable for the machine learning task based on the performance scores. This invention can be used for predicting patient discharge, predictive control in buildings for energy optimization, and so on.

20 Claims, 20 Drawing Sheets

Related U.S. Application Data

(60) Provisional application No. 62/962,223, filed on Jan. 17, 2020.

(51) Int. Cl.
    *G06F 18/20*     (2023.01)
    *G06F 18/21*     (2023.01)

(56) References Cited

U.S. PATENT DOCUMENTS

| | | | |
|---|---|---|---|
| 11,429,895 B2* | 8/2022 | Yakovlev | G06N 5/01 |
| 11,509,674 B1* | 11/2022 | Beauchesne | H04L 63/1425 |
| 2015/0220871 A1 | 8/2015 | Rajan et al. | |
| 2016/0132787 A1 | 5/2016 | Drevo et al. | |
| 2017/0103413 A1 | 4/2017 | He et al. | |
| 2019/0155633 A1 | 5/2019 | Faulhaber et al. | |
| 2019/0244110 A1 | 8/2019 | Qiu et al. | |
| 2020/0143243 A1* | 5/2020 | Liang | G06N 3/086 |
| 2020/0167691 A1 | 5/2020 | Golovin et al. | |
| 2020/0184382 A1* | 6/2020 | Fishkov | G06N 20/20 |
| 2020/0226496 A1* | 7/2020 | Basu | G06N 5/01 |
| 2020/0302234 A1* | 9/2020 | Walters | G06F 16/9035 |
| 2020/0327412 A1* | 10/2020 | McCourt | G06N 20/20 |
| 2021/0004727 A1 | 1/2021 | Bin Awang Pon | |
| 2021/0034924 A1* | 2/2021 | McCourt | G06F 18/2148 |
| 2021/0208545 A1* | 7/2021 | Zhang | G05B 13/042 |
| 2022/0188700 A1* | 6/2022 | Khavronin | G06Q 30/0201 |
| 2022/0331197 A1* | 10/2022 | Sloan | H04N 21/42201 |

FOREIGN PATENT DOCUMENTS

| | | |
|---|---|---|
| CN | 110462636 A | 11/2019 |
| KR | 20190062848 A | 6/2019 |

OTHER PUBLICATIONS

Truong, Anh et al. "Towards Automated Machine Learning: Evaluation and Comparison of AutoML Approaches and Tools," arXiv:1908.05557v2, Sep. 3, 2019.

Schmidt, Mischa et al., "On the Performance of Differential Evolution for Hyperparameter Tuning," arXiv;1904.06960v1, Apr. 15, 2019.

Zhong, Jie et al. "Asynchronous Parallel Empirical Variance Guided Algorithms for the Thresholding Bandit Problem," arXiv:1704.04567v2, Jul. 9, 2017.

Khiari, Jihed et al. "MetaBags: Bagged Meta-Decision Trees for Regression," Dec. 2018; ArXiv.org; Cornell University; Ithaca, NY, USA.

Elshawi, Radwa et al. "Automated Machine Learning: State-of-The-Art and Open Challenges," arXiv:1906.02287v2, Jun. 11, 2019.

Liang, Jason et al. "Evolutionary Neural AutoML for Deep Learning," arXiv:1902.06827v3, Apr. 9, 2019.

Kandasamy, Kirthevasan, "Tuning Hyperparameters without Grad Students: Scaling up Bandit Optimisation," PHD Thesis, Carnegie Mellon University, Oct. 2018.

Mendoza, Hector et al. "Towards Automatically-Tuned Neural Networks," JMLR: Workshop and Conference Proceedings 64:58-65, ICML 2016 AutoML Workshop, Jun. 2016.

Domhan, Tobias et al. "Speeding up Automatic Hyperparameter Optimization of Deep Neural Networks by Extrapolation of Learning Curves," Jul. 2015.

* cited by examiner

META-AUTOMATED MACHINE LEARNING WITH IMPROVED MULTI-ARMED BANDIT ALGORITHM FOR SELECTING AND TUNING A MACHINE LEARNING ALGORITHM

CROSS-REFERENCE TO PRIOR APPLICATIONS

This application is a continuation of U.S. application Ser. No. 16/831,845 filed on Mar. 27, 2020, which claims priority to U.S. Provisional Patent Application No. 62/962,223 filed on Jan. 17, 2020, the entire contents of each of these applications being hereby incorporated by reference herein.

FIELD

The present invention relates to machine learning (ML), and in particular a method and system for meta-automated ML which uses a multi-armed bandit algorithm for selecting and tuning an ML algorithm.

BACKGROUND

When applying ML, several high-level decisions have to be taken. For example, a learning algorithm, or base learner, needs to be selected from a plethora of different available learning algorithms. Each learning algorithm comes with a different set of hyperparameters that can be optimized to maximize the algorithm's performance concerning an application-specific error metric for a given dataset. Also, different feature preprocessing algorithms and feature selection techniques, each with their set of hyperparameters, can be combined into an ML pipeline to improve the base learner's performance. Accordingly, different hyperparameters need to be tuned and different data preprocessing and feature engineering techniques may be applied. Automated machine learning (AutoML) investigates the automation of selecting base learners and preprocessors as well as tuning the associated hyperparameters.

First, AutoML is motivated by the aim of allowing non-experts to leverage ML. Second, it is also motivated by making the process of applying ML more efficient, e.g., by using automation to lower the workload of expert data scientists. Third, AutoML is desired to provide a principled approach for applying base learners to ML problems (see, e.g., Mischa Schmidt, et al., "On the Performance of Differential Evolution for Hyperparameter Tuning," arXiv; 1904.06960v1, (Apr. 15, 2019), which is hereby incorporated by reference herein). Anh Truong, et al. "Towards Automated Machine Learning: Evaluation and Comparison of AutoML Approaches and Tools," arXiv:1908.05557v2, (Sep. 3, 2019), which is hereby incorporated by reference herein, describe the potential of AutoML to reduce repetitive tasks in ML pipelines and thereby boost productivity for data scientists, ML engineers and ML researchers using a number of different tools and platforms which attempt to automate repetitive tasks.

For automating traditional ML several open source software frameworks exist, for example, as listed in Schmidt, et al., "On the Performance of Differential Evolution for Hyperparameter Tuning," arXiv;1904.06960v1 (Apr. 15, 2019), which is hereby incorporated by reference herein. The associated scientific studies usually document the feasibility and ML performance on a range of well-known test datasets provided, for example, in the openML community. Frameworks such as these usually attempt to find, for a user's ML task, the most suitable ML algorithm with the best performing hyperparameter settings (and training the selected and parametrized algorithm on the task's data). This is referred to as algorithm selection and hyperparameter tuning. Further, the frameworks train the selected and parametrized algorithm on the data of the ML task. It is noted that the publications mentioned above do not describe how a layman user can easily invoke AutoML, but require programming proficiency.

Dedicated to deep learning, the topic of neural architecture search (NAS) is addressed in a number of publications. The frameworks described in these publications focus on devising architectures of neural networks by parametrizing deep learning libraries such as keras (keras.io) or tensorflow.

Recently, Micah J. Smith, et al., "The Machine Learning Bazaar: Harnessing the ML Ecosystem for Effective System Development," arXiv:1905.08942v3 (Nov. 12, 2019), which is hereby incorporated by reference herein, describe an AutoML framework referred to as AutoBazaar which bases the concept of ML pipeline templates by leveraging various different existing ML and data manipulation libraries. The pipeline template is AutoBazaar's means of abstraction for algorithm selection and hyperparameter tuning. For that, AutoBazaar describes an approach (algorithm 2) that iterates over the consecutive steps of selecting algorithms (actually, pipeline selection among many possible candidate pipeline variants), tuning the according hyperparameters (of the various algorithms/steps entailed in the selected pipeline) and training the pipeline (including the ML algorithm inside the pipeline).

U.S. Patent Application Publication No. 2016/0132787 describe a cloud AutoML concept as follows: users define data runs, or tasks, and enter them into a database. One of potentially many worker nodes (in a cloud setting) identifies, via a selection strategy, the so-called "hyperpartition" for which to tune hyperparameters. During tuning, models are already trained, and tested on the given dataset in order to compute performance scores based on a performance function for the user-specified task (e.g. the well-known Mean Squared Error (MSE) metric). Selection strategies can either be uniform at random, or building on the so far reached performance scores a standard multi-armed bandit algorithm (called UCB1), or one of two variants of the multi-armed bandit algorithm that are capable with drifting rewards denoted 'BestK' and 'BestKVelocity'. The hyperpartition is defined as the choice of categorical hyperparameters, for example which algorithm to run. To tune hyperparameters, the commonly known Bayesian optimization via Gaussian processes is applied. By applying the selection strategy and then Bayesian optimization, the worker identifies what training job (ML algorithm/pipeline) is to be applied to the dataset next and enters a corresponding training job description into a central database. When a worker node is available (i.e., idle), it will check the central database, work on one of the potentially many training jobs in that database and mark the training job as started to prevent other workers to work on the same job. When ML is complete, the worker will store performance and the associated model and check for a next training job, or attempt to create a new training job for one of the specified data runs.

There are also AutoML as a service (AMLaaS) offerings such as GOOGLE Cloud AutoML focusing on deep learning approaches, MICROSOFT AzureML leveraging AZURE ML algorithms, SALESFORCE TransmogrifAI and UBER Ludwig. The internal operations of these mechanisms are however not disclosed, thus it is not public knowledge how these scale their AMLaaS operations to millions of user requests. Also, it is not known or disclosed how these mechanisms would be able to leverage and match existing ML or deep learning algorithms.

SUMMARY

In an embodiment, the present invention provides a method for automated machine learning. The method includes controlling execution of a plurality of instantiations of different automated machine learning frameworks on a machine learning task each as a separate arm in consideration of available computational resources and time budget whereby, during the execution by the separate arms, a plurality of machine learning models are trained and performance scores of the plurality of trained machine learning models are computed such that one or more of the plurality of trained machine learning models are selectable for the machine learning task based on the performance scores.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
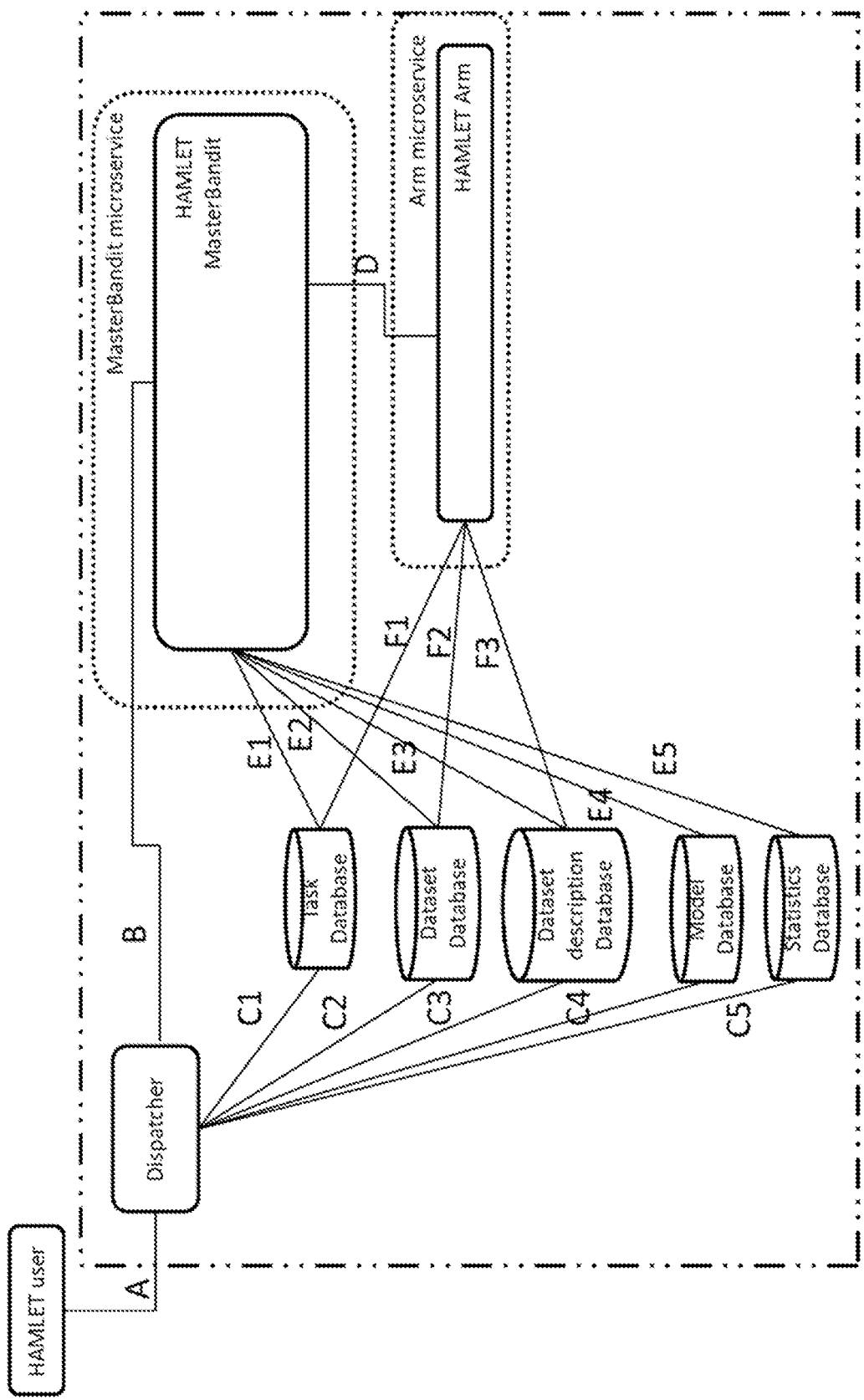
FIG. 1 schematically illustrates an embodiment of a system and method for meta-AutoML according to the present invention, which is referred to herein as Hierarchical Automated Machine LEarning with Time-awareness (HAMLET) due to the hierarchical decision making and the ability to account for the progress of time.

Embodiments of the present invention provide a system and method for meta-AutoML that leverages on existing frameworks and libraries for algorithm selection and hyper-parameter tuning, as well as ensembling. The method and system use a modified multi-armed bandit algorithm enhanced with learning curve extrapolation to predict each arm's performance. The system is designed for convenient operability. Embodiments of the present invention are designed favorable so as to integrate NAS frameworks in a conceptually similar way as the AutoML frameworks for traditional ML algorithms.

While it is possible to use multi-armed bandit algorithms such as UCB1 for learning to select optimally among multiple choices, typically these algorithms assume stationary reward distributions (in essence, the expected rewards received by the multi-armed bandit algorithm for the different arm should not change over time). In AutoML settings, however, the rewards are non-stationary as the arms, such as the hyperpartitions in U.S. Patent Application Publication No. 2016/0132787 or the AutoML frameworks in embodiments of the present invention, become better the more computation time they are awarded (i.e., the more they are pulled). U.S. Patent Application Publication No. 2016/0132787 addresses that via the variants Best-K (reflecting only a subset of the received rewards—the size of the subset is identified via the configuration parameter K) or Best-K-Velocity (reflecting the difference of the rewards in the subset of K best rewards). However, these multi-armed bandit algorithms only look in the past and thus do not properly represent the problem.

With respect to providing AMLaaS and coordination of workload, the known approaches except for the approach described in U.S. Patent Application Publication No. 2016/0132787 do not concern themselves with how to scale to provide AMLaaS, e.g., using cloud computing. In U.S. Patent Application Publication No. 2016/0132787, a large-scale distributed architecture is used and it is compatible with cloud services. In this publication, workers pull work from a central database and work means either running one ML job (training an ML algorithm as parametrized) or fetching a data-run to decide a hyperpartition and hyper-parametrization to enter into the database for other workers to fetch/work on. The approach of U.S. Patent Application Publication No. 2016/0132787 requires that jobs or data-runs are assigned priorities and workers then select central database entries, for example taking into account these priorities. The inventors have recognized that this is a disadvantage as it requires user interaction and knowledge in terms of assigning priorities. Further, the approach of U.S. Patent Application Publication No. 2016/0132787 has certain characteristics/implications that are detrimental to the AutoML problem. The following holds for all learning strategies in U.S. Patent Application Publication No. 2016/0132787 (i.e., not the uniform at random strategy which is suboptimal itself, as it cannot exploit observations made during training): the approach chooses for a data run a hyperpartition using a selection strategy, specifically a multi-armed bandit algorithm. Multi-armed bandit algorithms such as UCB1, Best-K or Best-K Velocity as described in U.S. Patent Application Publication No. 2016/0132787 will select based on observed experiences (performance scores of already trained models of the different possible hyperpartitions). When the multi-armed bandit algorithm observes a new experience in the database (i.e., a worker finished the job and stored the model along with its performance in the database), it will update its statistics. The way U.S. Patent Application Publication No. 2016/0132787 specifies the algorithms, the algorithms can only observe a new experience when a worker finishes training a model for the data run in question. After a hyperpartition is chosen, a tuning strategy is applied. That tuning strategy is Bayesian optimization and updates its probabilistic models on experiences of its associated hyperpartition that have already been observed. These models are then used to identify the most promising hyperparameter configuration, for example using the well-defined expected improvement criterion. The Bayesian optimization is only after choosing a hyperpartition and is separate from the multi-armed bandit framework and cannot be used beforehand to predict performance of individual arms. Conventionally, there is a single-most promising hyperparameter configuration that the worker then requests execution for via the central database. In summary, the mechanisms of U.S. Patent Application Publication No. 2016/0132787 do not explain how multiple jobs for a single data run be requested and executed (as the models need to be updated).

Embodiments of the present invention can leverage different frameworks. AutoBazaar, auto-sklearn, the framework of U.S. Patent Application Publication No. 2016/0132787, etc. require tuning the ML algorithms' parameters and do not leverage different AutoML-frameworks. In other words, known approaches only considers different ML algorithms and their hyperparameters, as opposed to considering different AutoML-frameworks or algorithms to do algorithm selection and hyperparameter tuning. The inventors have discovered that this can lead to disadvantages for the following reasons: AutoML is still a field of active research, new ideas and open-source frameworks are published frequently, where no clear cutting-edge framework exists (see Anh Truong, et al. "Towards Automated Machine Learning: Evaluation and Comparison of AutoML Approaches and Tools," arXiv:1908.05557v2, (Sep. 3, 2019)). Additionally, for different types of datasets and problems, different algorithms for hyperparameter tuning and algorithm selection can lead to the best results (see, e.g., Mischa Schmidt, et al., "On the Performance of Differential Evolution for Hyperparameter Tuning," arXiv;1904.06960v1, (Apr. 15, 2019)). Further, for example, running Gaussian processes for tuning hyperparameters for neural networks is still a field of active research. If new algorithms are found or new frameworks are published, the above-mentioned previous approaches cannot easily integrate them to their system. They would need to solve the problems for their particular framework setting and implement it by themselves to fit their frameworks' needs, for example they would need to solve how the Bayesian optimization approach will work efficiently for NAS. This means, new findings in research cannot easily be integrated, which leads to delays in improvement.

Additionally, it is not seen how approaches such as in U.S. Patent Application Publication No. 2016/0132787 could integrate AMLaaS frameworks such as GOOGLE AutoML. This can be a disadvantage, as for example integrating GOOGLE AutoML might lead to better results in terms of score as open-source frameworks.

Further, in the above-mentioned previous approaches, programming skills are needed to work with the AutoML frameworks and no easy-to-use application programming interface (API) exists. This decreases the ease of use for layman users (who build an important target audience for AutoML).

Embodiments of the present invention overcome the above-described issues and problems from the previous approaches.

First, with respect to the issue concerning non-stationary rewards, embodiments of the present invention provide an extrapolating multi-armed bandit algorithm, which means looking into the future by fitting learning curve functions to the arms' past rewards and extrapolating them until the end of the remaining time budget. Therefore, embodiments of the present invention provides improved insight into how to assign time budget among the alternatives as time progresses. The approach of working on learning curves as they evolve over runtime is also very beneficial in another aspect when compared to the "function invocation"-based evaluation in U.S. Patent Application Publication No. 2016/0132787 (and other works) in which the mechanism updates all statistics based on the model performance recorded in the central database, and these performance statistics are updated based on model performance after evaluating the trained model. That implies that before being able to update statistics, model training (or model trainings if parallel trainings are performed) has to finish as the performance statistics are based on the unit of "function evaluations" (where function refers to training a parametrized algorithm on the dataset and recording its performance). This is owing to the fact that the multi-armed bandit algorithms and Bayesian optimization in U.S. Patent Application Publication No. 2016/0132787 work on past samples (i.e. only after they see new data (a newly trained model's performance) they can update their predictions and get to better predictions). By leveraging learning curve extrapolation over time in embodiments of the present invention, sampling can occur every x seconds and update predictions for the Multi-Armed Bandit's arms' learning curves can be updated. As long as no new best model is reported with its score, the performance of the arm simply stays constant in performance while time progresses (and budget is reduced). This also means that embodiments of the present invention can at any time stop execution of an arm and assign execution rights to another if that other arm is predicted to perform favorably based on the learning curve. In contrast, the approach of U.S. Patent Application Publication No. 2016/0132787 would have to wait until a model has finished execution in order to see changes in the arms' evaluations, and thus change the choice of the multi-armed bandit algorithm (or the Bayesian optimization), which may take a long time.

Second, with respect to the issues with providing AMLaaS and coordination of workload, embodiments of the present invention are designed to scale from single computer to cloud settings easily, as described below, and thus overcomes the issue of scaling to provide operation in the AMLaaS setting. The difference of coordinating AutoML workload between the approach of U.S. Patent Application Publication No. 2016/0132787 and embodiments of the present invention is self-evident: in the approach of U.S. Patent Application Publication No. 2016/0132787, workers pull work from a central database and work means either running one machine learning job (training a machine learning algorithm as parametrized) or fetching a data-run to decide a hyperpartition and hyperparametrization to enter into the database for other workers to fetch/work on. In contrast, embodiments of the present invention use a dispatcher-master-worker concept, in which a master is assigned an ML task by the dispatcher and the master assigns a time budget to the workers that the dispatcher collaborates with, wherein multiple workers can run in parallel if desired. This is beneficial to control resources on a per AutoML task (referred to as a "data-run" in U.S. Patent Application Publication No. 2016/0132787). The approach of U.S. Patent Application Publication No. 2016/0132787 requires that jobs or data-runs are assigned priorities and workers then select central database entries, for example taking into account these priorities.

Third, with respect to leveraging different frameworks and in contrast to the above-mentioned previous approaches, embodiments of the present invention are able to leverage different AutoML frameworks (which run their internal algorithm selection and parameter tuning logics), which can be chosen among by means of the improved multi-armed bandit algorithm. The approach according to embodiments of the present invention, while conceptually more simple, is desirable as it can overcome disadvantages discussed above. Additionally, embodiments of the present invention can integrate AMLaaS frameworks, such as GOOGLE AutoML, to lead to better scores.

Fourth, with respect to providing ease of use for layman users, embodiments of the present invention overcome the issues discussed above by providing an easy-to-use API. Therefore, embodiments of the present invention provide for easier and greater access to ML.

In an embodiment, the present invention provides a method for automatically selecting a machine learning algorithm and tuning hyperparameters of the machine learning algorithm. A dataset and a machine learning task are received from a user. Execution of a plurality of instantiations of different automated machine learning frameworks on the machine learning task are controlled each as a separate arm in consideration of available computational resources and time budget, whereby, during the execution by the separate arms, a plurality of machine learning models are trained and performance scores of the plurality of trained models are computed. One or more of the plurality of trained models are selected for the machine learning task based on the performance scores.

In an embodiment, the performance scores are extrapolated for a remainder of the time budget based on achieved performances of respective ones of the arms during a time interval of the execution which is a portion of the time budget.

In an embodiment, the method further comprises assigning the computational resources to the arms during the remainder of the time budget based on the extrapolated performance scores.

In an embodiment, the performance scores are extrapolated by fitting a learning curve function to past rewards of the respective ones of the arms and extrapolating the past rewards until an end of the remainder of the time budget.

In an embodiment, the method further comprises freezing the execution of at least one of the arms based on the extrapolated performance scores.

In an embodiment, the method further comprises resuming the execution of the at least one of the arms from a point at which the freezing occurred.

In an embodiment, at least some of the arms are executed by time multiplexing using a selection mechanism to allocate the computational resources to the arms during the time budget.

In an embodiment, at least some of the arms are executed in parallel.

In an embodiment, the method further comprises building an ensemble from the plurality of trained models.

In an embodiment, each of the arms are executed as a microservice component of a cloud computer system architecture in a docker container which has a container image for a respective one of the automated machine learning frameworks.

In an embodiment, the docker containers are contained within a larger docker container, which contains separate docker containers for components which control the execution of the arms.

In an embodiment, the method further comprises constructing a learning curve for each of the arms during a time interval of the execution within the time budget, extrapolating performance scores of each of the arms until a remainder of the time budget, and freezing or disabling execution of at least some of the arms based on the extrapolated performance scores.

In an embodiment, the learning curves are constructed based on maximum performance scores achieved by respective ones of the arms during the time interval.

In another embodiment, the present invention provides a microservice component encapsulated in a docker container of a cloud computing system architecture comprising one or more processors which, alone or in combination, are configured to provide for execution of a method comprising: controlling execution of a plurality of instantiations of different automated machine learning frameworks on a machine learning task each as a separate arm in consideration of available computational resources and time budget, whereby, during the execution by the separate arms, a plurality of machine learning models are trained and performance scores of the plurality of trained models are computed.

In a further embodiment, the present invention provides a tangible, non-transitory computer-readable medium having instructions thereon which, upon being executed by one or more processors, alone or in combination, provide for execution of a method according to an embodiment of the present invention.

Embodiments of the present invention provide a meta-AutoML system and method which is referred to herein as HAMLET. HAMLET leverages existing AutoML frameworks (which in turn leverage existing ML libraries) to solve a user's task. HAMLET supports parallel execution of different users' tasks and supports deployment in different settings. HAMLET additionally comes with an easy-to-use API in order to support usage by layman users. Further, HAMLET can manage given time budget limitations (and hardware limitations) by using a special multi-armed bandit algorithm.

HAMLET can be provided as an AutoML platform with the following characteristics in order to find the best possible model for a given ML task:
  automates algorithm selection and hyperparameter tuning
    for a very wide range of algorithms (by integration of different frameworks), for different types of ML tasks,
  can be used by multiple (possibly layman) users on different hardware settings,
  includes time budget management,
  eases the access to ML by an easy-to-use API Table 1 below shows terms and definitions used in herein to describe HAMLET.

TABLE 1

| Term | Definition, description, explanation |
| --- | --- |
| Ensemble | A set of machine learning models to be used jointly for prediction tasks |
| Ensemble Learning | A domain of machine learning that focuses on the learning of ensembles of baseline models and their aggregation functions |
| HAMLET task | The high-level machine learning problem specification consisting e.g. of the dataset to be learned upon, the type of learning problem regression, classification or clustering and the loss function can be specified, also a stopping criterion can be specified |
| Input variables | The fields/variables within the dataset that the machine learning model should use to predict the target variable during the prediction phase. Sometimes also called "explanatory variables" in the machine learning literature. |
| Loss function | The error function to be used for penalizing prediction errors during the training process. AutoML tries to optimize for this loss function. |
| Machine Learning Model, or "Model" | A configured and trained instance of a machine learning pipeline applied to a particular training dataset. During solving a task, many models are trained. |
| Stopping criterion | A user specified criterion telling HAMLET when to stop AutoML. This can be in the form of a time budget, a minimum required performance threshold (related to the loss function) for the user's application, or lack of improvement (e.g. a period of time or number of main loop iterations) during which HAMLET's tuners did not improve in performance anymore |
| Target variables | The fields/variables within the dataset that the machine learning model should predict during prediction phase based on the input variables. The target variables need to be present (only) during training phase. May not be present in dataset if task is of type unsupervised, e.g. clustering |
| Time Budget | A time budget specified by the user for applying AutoML for the specified task. This can be in the form of a wallclock time budget (e.g. hours), or in terms of a total compute resource time budget (e.g. CPU hours) |

FIG. 1 depicts the HAMLET system architecture. In a beneficial embodiment, the interfaces HAMLET user—Dispatcher, Dispatcher—HAMLET MasterBandit, and HAMLET MasterBandit—HAMLET arm are realized as HTTP interfaces hosted, e.g., in a standard web framework such as flask for python. The interfaces to the depicted data storage components (database tables or separate databases) are based on standard approaches, e.g., based on structured query language (SQL). It is possible to merge or separate data storage or replace the depicted databases with, e.g., a file system based approach such as the hadoop distributed file system (HDFS). These realization choices affect the technical realization of interfaces C1-C5, E1-E5 and F1-F3.

The dispatcher component is the point of contact for the HAMLET user to request the HAMLET service. Therefore, the dispatcher's interface A may be used by the user to:
- upload a dataset and define a dataset description,
- provide a machine learning task description (e.g. performance function, budget, possibly which AutoML frameworks and configurations to use),
- request starting of a configured task,
- receive information on the progress of a specified machine learning task, e.g., performance scores and elapsed budget,
- optionally receive a notification when the training finished,
- receive an indication which was/were the best performing model(s) or ensemble(s);
- optionally receive the trained models as, e.g., serialized binary objects in a standardized format such as pickled python objects, and
- receive references to the models within HAMLET such as unique identifiers of the models within a HAMLET database.

The dispatcher registers tasks with the MasterBandit and invokes it to start training. For that, the dispatcher passes relevant configuration parameters (e.g., dataset reference task description, arm configurations) via interface B.

A HAMLET arm is an instantiation of an AutoML framework/algorithm for hyperparameter tuning and algorithm selection - this can, e.g., be an instantiation of a certain framework, or of a framework with a certain user defined configuration. Usually multiple HAMLET arms exist. The HAMLET MasterBandit controls execution of the HAMLET arms based on different decisions rules (different embodiments). It also manages the budget left for the task and checks whether requirements (regarding score to be reached) are met. Interface D carries the interactions among MasterBandit and the arms—most notably:
- reporting performance scores and trained models,
- starting, stopping, freezing and continuing execution of arms (and the AutoML processes within them), and
- sharing configuration information.

In the following, the components in a more detailed way.

Dispatcher Component

The dispatcher receives a machine learning task referring a dataset, a description of the dataset, a loss function, a stopping criterion and the type of machine learning problem the task is about (regression, classification or clustering). The user also specifies to the dispatcher which variables are input and which are output variables in the dataset. Optionally, HAMLET can deduce which type of data format is contained in each column automatically by applying programmatic heuristics from best practices obvious to someone skilled in the art.

In one embodiment, the type of machine learning can be inferred from the dataset directly. If all target variables indicated in the dataset description are of the categorical type, it is considered a classification problem. On the other hand, if the target variables contain floating point numbers, it is a regression problem. If not any target variable is contained in the dataset, it is of the clustering type.

Upon receiving the dataset, the HAMLET dispatcher stores it in a dataset storage (e.g. a database table) and assigns a unique dataset identifier returned to the user, and associates it to the user's task identifier. Upon receiving the dataset description, the HAMLET dispatcher stores it in a dataset description storage (e.g. a database table), assigns it a unique dataset description identifier, and associates it to the dataset identifier. Upon receiving the task specification, the HAMLET dispatcher stores it in a task storage (e.g. a database table) and assigns a unique task identifier.

In different embodiments, the following features are provided:
   In a particular embodiment, the interface A for the user to specify the task, upload the dataset, and specify the description of the dataset is a representational state transfer (REST)-based interface that carries the task and dataset descriptions in standard formats such as extensible markup language (XML) or JavaScript object notation (JSON) and allows dataset upload via standard file upload mechanisms.
   In a particularly relevant embodiment, the dataset is a tabular dataset stored in a comma separated value (csv)

file format. The dataset is uploaded via interface A via standard file upload mechanisms known from internet services.

In a beneficial embodiment, HAMLET offers the user to specify which of the supported arms to consider for solving the task. Moreover, the user may also specify concrete parametrizations of the components within the arms (e.g., exclusions of algorithms, or certain hyperparameter ranges) to HAMLET.

In a beneficial embodiment, when presented a new user task, HAMLET can choose to disable arms that do not fit the task or recommend arms which are especially promising. HAMLET uses features describing the task's dataset, e.g., the size, the data types present in the dataset, if there are missing features, etc. Also, the type of machine learning task (e.g. regression vs clustering) is meaningful to consider for the decision about which arms to apply. To identify meaningful arms to propose, approaches known from the state of the art for 'Meta-Learning' can be applied.

In a beneficial embodiment, the user has to provide authentication credentials prior to be able to use HAMLET.

Deployment

In the following, it is described how the HAMLET design allows scaling from a single computer to a distributed cloud setting with a massive number of parallel users and tasks.

As task solving may take a considerable amount of time, and as many parallel tasks may be requested by different users, it is necessary to be able to scale the system capacity. It is beneficial that HAMLET is designed to be compatible with standard mechanisms for scaling up web services in cloud service settings and can be employed to support many concurrent user requests.

A favorable embodiment of HAMLET encapsulates the MasterBandit as a microservice component, e.g., in a docker image. In this favorable embodiment, a cloud orchestrator component routes requests from the dispatcher to the MasterBandit. For example, Kubernetes can be used to manage overall cloud system resources and within these, many instances of MasterBandit containers. Similarly, a beneficial embodiment realizes the HAMLET arm component as a microservice as a docker container. Each arm is a separate container. This way, the HAMLET MasterBandit microservice can be realized in one of two options:

1. If its own container environment offers a docker server instance, it can run arms inside its own container. This option shares virtualized cloud resources assigned to the MasterBandit container among the MasterBandit's main loop (see below) and the different Arms' tuning calculations (see below), or
2. Alternatively, if the cloud environment in which HAMLET is deployed offers a docker server, the MasterBandit can request starting, freezing, stopping and termination of arm containers as needed in its main loop. In this way, the command set of interface D for controlling execution of the arms can be replaced by docker container execution control commands. Therefore, interface D becomes simpler.

Figure 2:
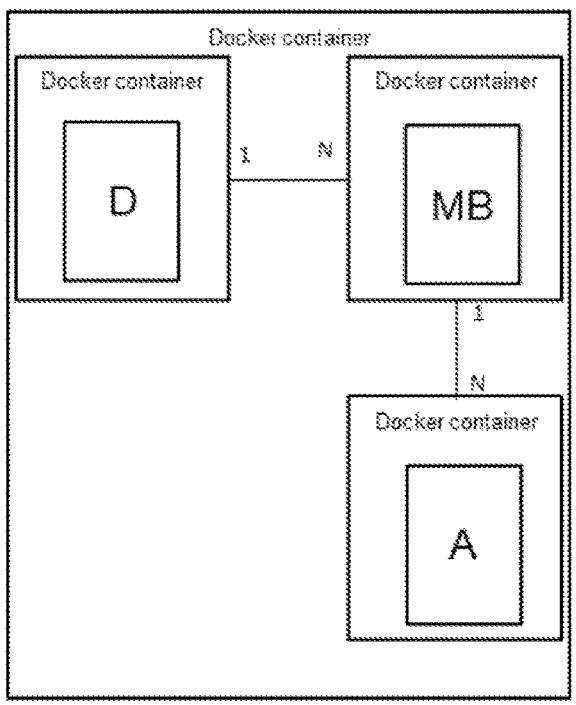
FIG. 2 illustrates docker options.
Figure 2:
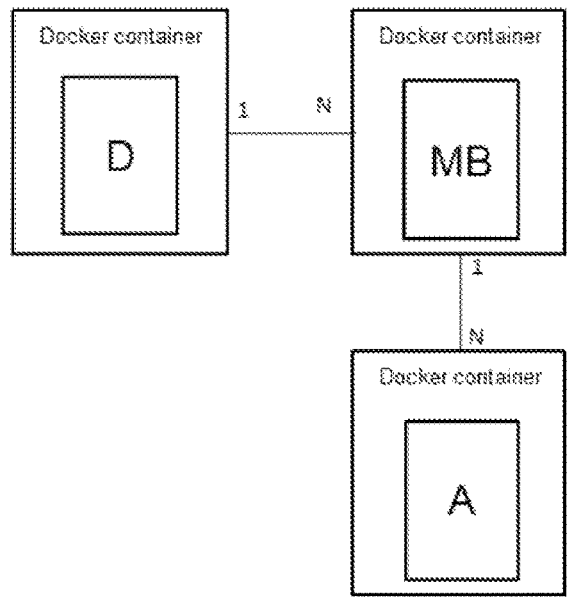

FIG. 2 depicts two general options for deploying HAMLET as examples. The letters 1 and N denote the usual cardinality of relationships among components: there are multiple MasterBandits MB associated to a single dispatcher D, and multiple arms A (depending on the task configuration) to a single MasterBandit MB. Requests among components may run via docker orchestration components, such as Kubernetes, or use direct reference to instantiated docker containers as provided by a docker server component. A system may host multiple dispatchers, instantiated on user request by a Kubernetes orchestrator, e.g., for load-balancing purposes, leveraging standard mechanisms defined in the state of the art.

In option 1, each of the microservice components is encapsulated in an individual docker container, but all docker containers are contained within a larger "outside" docker container. This might be a suitable deployment for a single PC or small server.

In option 2, the dispatcher, MasterBandit, and arm components are contained in individual docker containers.

In another embodiment, all microservice components (dispatcher, MasterBandit, arm) can be encapsulated in operating system (OS) processes or even computing threads instead of relying on, e.g., docker as a virtualization technique, with the associated standard mechanisms of execution runtime control. In this embodiment, freezing of arm execution may be realized via interface D as described above, or alternatively standard operating system process control commands are used to freeze and/or resume execution of arms.

A particularly favorable embodiment relies in a mixture of both encapsulations: the dispatcher microservice component is encapsulated as a docker image. Another docker image bundles the MasterBandit and the necessary framework libraries for realizing the arms as a process inside the same docker container. This way, the execution control commands (starting, stopping, freezing and resume) of arms in interface D is realized by standard OS process control mechanisms which simplifies implementation of interface D. In a favorable deployment, the dispatcher can then request execution of a MasterBandit in response to a user request via, e.g., a docker orchestrator such as Kubernetes.

In a favorable deployment, the microservice component dispatcher can (in response to a user's request) request the instantiation (and management) of a MasterBandit container from a docker server, or an orchestrator such as Kubernetes.

In a favorable deployment, the microservice component MasterBandit can request instantiation (and management) of a suitable number of arm containers from a docker server to solve a user's HAMLET task.

In an embodiment, different arm container images exist for different frameworks and are instantiated based on the HAMLET task specification. In this embodiment, the MasterBandit has to indicate the exact arm container type in its request to the docker server. The MasterBandit may also pass framework-specific configuration information pertaining to the HAMLET task (e.g., hyperparameter ranges to use or algorithms to consider).

In another embodiment, a general purpose arm container is configured with all possible frameworks supported by HAMLET and available for starting in the docker server. In this variant, the MasterBandit simply requests starting of the desired number of arm containers of the docker server and passes to the containers the necessary configuration to individualize their behavior, e.g., to behave as an auto-sklearn arm in addition to framework-specific configuration information pertaining to the HAMLET task to (e.g., hyperparameter ranges to use or algorithms to consider) for that arm.

MasterBandit and Arm Component

Different existing frameworks for AutoML (e.g., auto-sklearn, or PMF, NAS (e.g., auto-keras) or single-purpose machine learning tuning algorithms (e.g., the differential evolution-based approach described in Mischa Schmidt, et al., "On the Performance of Differential Evolution for Hyperparameter Tuning," arXiv;1904.06960v1, (Apr. 15, 2019), or the Bayesian optimization approaches for tuning a hyperpartition) are integrated as choices, or arms into the HAMLET MasterBandit. The MasterBandit can select from those for solving a particular user task. The different choices may or may not be applicable to any given user task. HAMLET arms can also integrate remote AutoML frameworks such as Google Cloud AutoML via the remote framework's client libraries (if provided) as tuners. Depending on the functionality of the remote framework, some of the below embodiments of execution are not possible, e.g., the GOOGLE AutoML framework does not support freezing of execution of training.

For each task, a single MasterBandit component interacts with one or more arms, each abstracting from libraries for AutoML and NAS as mentioned above and Cloud AMLaaS services such as GOOGLE AutoML by integrating their client libraries, or certain customized versions of those external libraries. While running, the arms execute the libraries on the user task. During execution, these libraries train many machine learning models and record associated scores. Performance scores of trained models and the models themselves are stored in the databases in FIG. 1.

During execution of an arm, new found models are continually reported and stored as soon as found, together with the reached scores and the training time (time needed to find these models). The HAMLET MasterBandit can request the scores and training times for each arm at each iteration.

The logic to control the execution of solving the specified task resides in the HAMLET MasterBandit component in FIG. 1. The MasterBandit decides on resources to be used for the arms, i.e., which arm to run in which time interval. The MasterBandit can pause/resume the running of arms.

In a beneficial embodiment, the MasterBandit executes arms for a configured or user specified time budget in parallel. This setting is beneficial if vast compute resources are available for solving the user's task. In this setting, the MasterBandit does not need to select among the different arms for execution. In this embodiment, the MasterBandit may monitor execution (training of models from all arms) in a main loop or at specified time intervals for the time until the task's associated stopping criterion is met. In a beneficial variant, the MasterBandit may apply learning curve extrapolation (LCE) as described below for the purpose of presenting diagnosing information to the user (e.g., the predicted performances of the different arms).

In another embodiment, the MasterBandit component multiplexes different arms using compute resources in time via a suitable selection mechanism. For this, the MasterBandit decides the sequence in which HAMLET arms may run. In this setting, it is beneficial if the MasterBandit applies machine learning to increase the performance of its decisions. To do so, the MasterBandit executes in a main loop for the time until the task's associated stopping criterion is met. In a variation, the MasterBandit allows a subset of arms to execute in parallel.

In a particularly beneficial embodiment denoted LCE, the HAMLET MasterBandit uses a novel and inventive improvement of a multi-armed bandit algorithm that extrapolates, during solving the user's task and for all arms, the expected performance to the end of the task's remaining time budget. The extrapolation is based on the arms' achieved best performances over their individual execution time within the task. HAMLET selects the one with the highest extrapolated performance. In this embodiment, only the different arms' maximum achieved performances over time are considered in the extrapolation.

In a variant of the LCE embodiment (see algorithm 1 below), when HAMLET takes the decision to execute an arm, it assigns a time interval (the interval can be a configuration parameter), executes the arm for the time interval, freezes execution of the arm via mechanisms pertaining to the deployment, e.g., provided by the arm microservice (e.g. via interface D), the virtualization environment encapsulating the arm container, or, e.g., process control. The MasterBandit checks the performance scores of the trained models, updates the learning algorithm (e.g. the Multi-Armed Bandit's statistics and associated extrapolation curves) to inform the next loop iteration's selection step. If in a later iteration the same arm is chosen again, the arm's execution can be resumed and directly start where it was frozen before, thus no computing time is lost. This approach is particularly beneficial as the MasterBandit can flexibly assign and re-assign arm execution while an arm has not increased its performance score yet, but as time advanced while executing the arm, the corresponding learning curve can be updated to consider if the compute resources should be re-allocated.

In a specific embodiment, a multi-armed bandit algorithm such as the well-known UCB1 algorithm (e.g. provided via the BTB library as referenced in Micah J. Smith, et al., "The Machine Learning Bazaar: Harnessing the ML Ecosystem for Effective System Development," arXiv:1905.08942v3 (Nov. 12, 2019)) can be used to select which arm to execute and learn, based on the achieved performance by the selected arms. In another embodiment, Best-K or Best-K-Velocity variants of the multi-armed bandit algorithm can be used in the MasterBandit (e.g. provided via the BTB library as referenced in Micah J. Smith, et al., "The Machine Learning Bazaar: Harnessing the ML Ecosystem for Effective System Development," arXiv:1905.08942v3 (Nov. 12, 2019)).

In another embodiment, when HAMLET takes the decision to execute an arm, it waits for it completing training of a pre-configured number of models (e.g., one). HAMLET checks the performance scores of the trained models, updates the learning algorithm (e.g., the multi-armed bandit algorithm's UCB1 statistics or associated extrapolation curves) to inform the next loop iteration's selection step. This approach can make use of LCE if the arms' learning curves are reported as best performance over the number of models trained by the different arms (effectively reinterpreting model training as a unit of time instead of, e.g., wall-clock time or CPU time).

In an embodiment, the MasterBandit uses the arctan function to fit and extrapolate the learning curve.

In an embodiment, the MasterBandit uses a neural network to fit and extrapolate the learning curve. In a particular favorable embodiment, the neural network for learning curve extrapolation has been pre-trained on exemplary learning curves from machine learning problems and datasets.

In a particular embodiment, the MasterBandit considers only the convex hull of the arms' recorded performance scores, i.e., their best scores as reported, to construct the arms' respective learning curves. In a beneficial embodiment, the MasterBandit fills the time intervals between the arms' recorded scores by creating artificial performance score samples for the timestamps between the arms' recorded scores.

One particular approach to the MasterBandit's main loop is described in the following algorithms:

Algorithm 1:

```
# model persistence and statistics persistence is skipped for simplicity
# of exposition

# The MasterBandit loops until the task's constraint specified by the
# user is met.
# This constraint could be a time budget. In the first iteration, all
# arms are tried once for giving the MasterBandit a first set of
# performance scores.
# After the first iteration, the MasterBandit
#         updates the arms' learning curves using the arms' scores
#         extrapolates the arm's learning curves until under the
#             assumption all remaining budget was dedicated to
#             the individual arm under consideration
#         The Master chooses among the learning curves the most favorable
#             arm and executes it for a configured time interval.
#             Stochastic exploration can be used by adjusting the
#             epsilon parameters in Algorithm 1.2
#         deduct time interval from budget remaining, check if constraints
#         are met.
#         If not met, repeat loop, otherwise stop training.
While ConstraintMet == False:
    Iteration k == 1: Each arm is run once for a predefined amount of Budget
    For each iteration k > 1:
        For each arm a:
            Update LC_a(t) = [x_a = (t1,...,tnow), y_a = (score_t1,...,score_tnow)]
            Extrapolated_LC_a= UpdateExtrapolatedLearningCurve(LC_a(t),
                        Budget_remaining)
            Next_arms, Next_Budget = MasterChooseArm(Extrapolated_LC_a for each
                        arm a, Budget_remaining, Desired_Score)
        Pause all arms not in Next_arms for Next_Budget seconds
        Resume all arms in Next_arms for Next_Budget seconds
        ConstraintMet = CheckConstraint(Budget_remaining, Desired_Score)
With    t: time
        score: scores reached by best models
        LC: Learning_Curve
        k: iteration
        a: arm
        LC_a(t): Learning Curve for arm a, depending on time t up until time tnow
        x_a: time (training time for related score, seconds arm has been running up
                until resp. score was found, for arm a)
        y_a: scores (scores that have been found by arm a, monotonically increasing)
        Next_arms: List of arms which where chosen by MasterBandit to run in the next
                iteration
        Next_Budget: Budget, seconds, for the next iteration, chosen by MasterBandit
```

Algorithm 1.1

```
UpdateExtrapolatedLearningCurve(LC_a(t), Budget_remaining):
    # Learning Curve for arm a is extrapolated: Extrapolated_LC
    # Extrapolated_LC estimates the future scores over time up until the
    # maximum available Budget (Budget_remaining).
    # a curve is fit, using standard regression algorithms, based on
    # scores observed so far (y) over time (t) with standard regression
    # algorithms we mean e.g. fitting a curve using an ilog or
```

Algorithm 1.1 -continued

```
# arctan function (for classification tasks) or using e.g. SVM
X = LC_a(t).x_a
y = LC_a(t).y_a
Extrapolated_LC = curve_fit(X, y)
Return Extrapolated_LC
```

Algorithm 1.2

```
MasterChooseArm(Extrapolated_LC_a for each arm a, Budget_remaining, Desired_Score):
    # The Master chooses an arm based on objective: It can either choose
    # the arm which is expected to have a user defined desired accuracy
    # first (op =1), or it can choose the arm which is expected to have
    # the highest score in the remaining amount of time (op =2).
    # The following shows a MasterBandit version, where due to very limited
    # resources only one arm per iteration should be run (it can be
    # adapted to run multiple arms per iteration in parallel).
    # Via epsilon parameter, stochastic exploration behavior is controlled
    If op == 1
        With probability epsilon1:
            Next_arm = argmin_a(Extrapolated_LC_a.x where
                    Extrapolated_LC_a.y > Desired_Score)
        With probability (1- epsilon1):
            Next_arm = random
```

Algorithm 1.2

```
If op == 2
  With probability epsilon1:
    Next_arm = argmax_a(Extrapolated_LC_a.y where
        Extrapolated_LC_a.x == t_max_available)
  With probability (1- epsilon1):
    Next_arm = random
  # Assign Budget for next Iteration based on Remaining Budget, Desired
  # Accuracy, and the Extrapolated LC for each arm:
  Next_Budget = AssignBudgetArm (Budget_remaining, Desired_Score, Extrapolated_LC_
a)
  Return Next_arm, Next_Budget
With   x: time (training time for related score, seconds arm has been running up until
        resp. score was found)
       y: scores (scores that have been found by arm, monotonically increasing)
```

Algorithm 1.3

```
CheckConstraint(Budget_remaining, Desired_Score):
  # Check whether all Budget is used and whether the Desired accuracy
  # is already reached
  Constraint_met = False
  if Budget_used >= Budget_remaining:
    Constraint_met = True
  if Highest_Score_Reached_above_all_arms >= Desired_Score:
    Constraint_met = True
  Return Contraint_met
```

In a beneficial embodiment, HAMLET tracks and stores models' wallclock execution times on a certain portion of the dataset (e.g. the test set commonly used to calculate the performance scores) in addition to the models' performance scores. This beneficially allows later to present the user not only the highest performing models, but also the fastest to execute. Also, this may inform ensemble building as indicated below.

When operating on the user's task, the HAMLET MasterBandit stores trained models, ensembles (see below), and achieves performance statistics in corresponding databases as indicated in FIG. 1. Alternatively, the arms store trained models and associated performance statistics in the databases themselves during executing instead of leaving storage to the MasterBandit.

On user request, the HAMLET dispatcher provides access to these stored models and statistics. In a beneficial variant, HAMLET may be configured to only retain a certain percentage or a certain number of the top performing models. This configuration may be provided by the user along with the task definition, or it can be a HAMLET configuration parameter.

In an embodiment, the MasterBandit can trigger the dispatcher to notify the user, e.g., via an email address associated to the user or associated to the user's task (provided then as part of the task definition), that the user's task is finished.

In an embodiment, the MasterBandit is configured by a human system administrator with the permissible computing resource usage. The MasterBandit can then select the appropriate mode (running all arms in parallel, or multiplexing in time).

In another beneficial embodiment, the MasterBandit can be informed by the deployment orchestration technology (e.g., MasterBandit queries the orchestrator, or the orchestrator notifies the MasterBandit) or a suitable cloud system load information service about the permissible computing resource usage. The MasterBandit can then switch between the mode of running all arms in parallel, and the mode of multiplexing in time.

In a beneficial embodiment, HAMLET can be provided as a Meta-AutoML cloud-based system.

HAMLET with Ensembling

In a beneficial embodiment, HAMLET also offers to build ensembles based on all or a subset of the task's trained models. For this, models created form different tuners (and frameworks) can be combined in ensembles. Specifically, HAMLET may select a preconfigured number or proportion of the top performing models. In another variant, HAMLET may select the fastest to execute models. In yet another embodiment, HAMLET may select models based on the types of machine learning algorithms, so as to diversify the algorithms constituting the ensemble. Three different embodiments to schedule the ensembling are presented:

In one embodiment, the MasterBandit executes model ensembling calculations after the task's stopping criterion is met.

In another embodiment, during the main loop, the MasterBandit executes at specified intervals ensembling calculations, e.g. every 5 iterations or every 20 seconds.

In the third embodiment, during the main loop, HAMLET treats model ensembling calculations as a special form of tuner, i.e., it is treated as one of the MasterBandit's arms to select from with consequences and implications as described above.

In a particular embodiment, HAMLET uses the MetaBags concept for ensembling calculations (see Jihed Khiari, et al., "MetaBags: Bagged Meta-Decision Trees for Regression," which is incorporated by reference herein). For this, HAMLET creates different bootstrap samples of the task's dataset to calculate MetaBags specific meta-features. In another embodiment, HAMLET uses model averaging (averaging all constituent models' predictions) as a means for ensembling.

HAMLET with Access to Massive Parallelism, Walltime Budget

In another embodiment, HAMLET is deployed in a cloud setting with an abundance of computing resources available to solve a user's task, with only a total wallclock time budget specified. In this setting, the MasterBandit can run all its arms to be used in the specified task in parallel as described above for the budget given. The frameworks in the arms however may face inherent challenges to scale satisfactorily to, e.g., a large number of CPUs. Therefore, the HAMLET MasterBandit can choose to:

Modify the configuration of each arm such that the respective arm focuses on a limited search space, e.g. by limiting the number of algorithms to consider in the arm, and/or by reducing the range of values for specific hyperparameters to consider in the arm's framework, and Make up for the limitation in the modified arms by adding complementary arms that are configured to cover the algorithms and/or hyperparameter ranges that the modification removed from the modified arms' configuration scopes.

HAMLET for Particular Use Cases

A particular embodiment of HAMLET can be advantageously used for Smart Cities. A set of cameras monitoring pedestrian traffic feeds into a demographics detection engine such as FieldAnalyst by NEC CORP. FieldAnalyst generates an anonymized breakdown of demographic statistics of pedestrians (gender, age bracket) over time as they pass through the monitored area. This data, together with weather data, and available data on scheduled events in the vicinity of the monitored area, serves as input to HAMLET to learn predicting future pedestrian traffic demographics. Upon solving the task, HAMLET produces a set of models which are able to predict with a certain accuracy the upcoming pedestrian demographics. Such predictions then can constitute the base for dynamic traffic control decisions (e.g., to lower traffic in case of predictions), or inform marketing for shops to, e.g., prepare their offerings for upcoming crowds of pedestrians.

In another embodiment of HAMLET for Smart Cities, a set of cameras monitoring road traffic feeds into a flow analytics engine that can, e.g., detect number of cars, large cars (trucks, buses, etc.) and bikes in a time interval. This traffic flow demographics data, together with weather data, and other data on scheduled events in the city, serves as input to HAMLET to learn predicting future traffic flow demographics, e.g., the share of e.g. trucks vs cars vs bikes. Upon solving the task, HAMLET produces a set of models which are able to predict with a certain accuracy the upcoming traffic flow demographics. Such predictions then can constitute the base for dynamic traffic control decisions (e.g., to lower traffic in case of predictions), for decisions to, e.g., dispatch additional traffic police for managing traffic, or for decisions on, e.g., requests of rerouting of certain share of drivers via an interface to a navigation system provider.

An embodiment of HAMLET can be advantageously used for predictive control in Smart Buildings for energy optimization. A Smart Building is equipped with sensors measuring room temperatures that are accessible via an Internet-of-Things (IoT) infrastructure platform, e.g., via FIWARE. Alternatively, or in addition, the building's hydroponic heating system operation status (on, off, temperatures) is accessible, e.g., from its building management system. This sensor data, together with relevant weather data can be provided to HAMLET to identify a highly accurate predictive machine learning model, e.g., for several hours or even days in advance (especially when using weather forecast services, e.g., from the internet). In a beneficial variant, HAMLET can also be applied to energy meter readings to identify a machine learning model able to predict how the heating system's operational settings and the weather influence relate to heating system's energy use. These predictive models (e.g., room temperature prediction and energy consumption) can then be used by an optimization algorithm such as a genetic algorithm, differential evolution or particle swarm optimization to evaluate under which heating system settings the building will meet or violate building-specific target room temperature ranges, and how to optimize heating system energy usage.

An embodiment of HAMLET can be advantageously used by hospitals for predicting patient discharge. For hospital management, it can be advantageous to know when a patient is likely to be discharged. This can be achieved by encoding patients' health data, physiological measurements (e.g., heart rate and blood pressure) and general patient information (e.g., age, gender) in numeric values by methods known from the state of the art, and providing this numeric data together with the number of days the patients remain staying in a hospital to HAMLET. HAMLET will efficiently produce predictive machine learning models that are able to predict for new and already admitted patients how long the respective patient will stay in hospital. This discharge information can then be used, e.g., for the hospital's resource planning.

An embodiment of HAMLET can be advantageously used for quantitative trading. Informing trading decisions of investors can be achieved by providing securities' fundamental data and their time series of trading prices to HAMLET to identify machine learning models that a) classify securities that should be bought or sold, and/or b) predict future security prices (e.g., the closing price of a stock in a week from when the prediction was executed).

An embodiment of HAMLET can be advantageously used for the e-health domain. Medical data is given, and this data can serve as input to HAMLET to learn classifications of sickness based on the data. An example is as follows: data which has been collected at hospitals to analyze factors of diabetes (e.g., age, time in hospital, medication, other sicknesses, etc.). The task is to classify the risk of diabetes patient p of having to be readmitted to the hospital for an emergency diabetes case based on the data given. Upon solving the task, HAMLET produces a set of models which are able to classify with a certain accuracy the emergency-submittance risk of a patient. Such classifications can then be used to support doctors in their decision making and provide hints and signs for particular treatment. This can also be applied to other sickness cases.

An embodiment of HAMLET can be advantageously used for air quality predictions. A set of sensors monitoring road traffic and weather, as well as air quality (e.g., levels of $SO_2$ or microscopic particulate matter) in a time interval. This serves as input to HAMLET to learn predicting future air quality, e.g., the levels of $SO_2$ or microscopic particulate matter. Upon solving the task, HAMLET produces a set of models which are able to predict with a certain accuracy the upcoming air quality values. Such predictions then can constitute the base for dynamic traffic control decisions (e.g., to lower traffic in case of predictions), or for decisions on public transport. Another use of such predictions is to build end user apps informing the general public of times when certain areas of interest are predicted to be highly polluted.

In general and independent of use case, embodiments of the present invention provide the following improvements/advantages:

1) Design of a meta-AutoML method that can easily integrate new AutoML frameworks (for NAS, or for traditional ML) as arms as they are developed in the state of the art, including a novel and inventive improved multi-armed bandit algorithm to choose among different applicable AutoML frameworks (arms) by learning and extrapolating their performance for efficient computation resource usage by time multiplexing, which avoids the drawback of multi-armed bandit algorithms which base their calculations on statistics of past performances.
2) Design of a system which is scalable from a single PC to massively parallel cloud deployments on different hardware settings, which can also cope with running frameworks (arms) in parallel or multiplex their execution in time by using a flexible system architecture which, e.g., encapsulates the bandit as a microservice component who manages the deployment of arm microservice components (with budget awareness).
3) Provision of an enhanced multi-armed bandit algorithm with LEC which improves assignment of computing resources within time budget to framework execution in scenarios of scarce computation resources. Better scores can be found when limited resources are given or the desired scores can be found faster.
4) Support of deep learning, as well as traditional ML. Also supports different types of learning problems (regression, classification, clustering). The ability to use more algorithms leads to better scores.
5) Provides built-in ensembling of models across many different frameworks. This leads to better scores as models from across frameworks are used (more good models incorporated results in better scores).

In an embodiment, a method for automatically selecting, tuning and training machine learning algorithms for user specified machine learning tasks comprises the steps of:
1) Receiving a dataset from a user.
2) Receiving a particular machine learning task from a user.
3) Controlling execution of multiple instantiations of AutoML frameworks and/or algorithms (arms) according to available compute resources and time budget, using the learning and extrapolation of performance for remaining task time budget, with the goal of finding trained models for the particular task.
4) Collecting a multitude of trained models for the task for later user retrieval, as well as finding the highest scoring model for the particular task.

In comparison to a user invoking training of a task on open source frameworks integrated as arms in HAMLET on its own, and not using the multi-armed bandit algorithm for resource management, embodiments of the present invention provide a number of improvements. In the former case, the user could have to store and compare resulting models by him/herself. This would implicate following drawbacks:

Decisions on what frameworks can be used for a given dataset need to be made by user (the MetaAutoML effect of this step is lost).
Parallel deployment of frameworks needs more computation power than integration with the HAMLET multi-armed bandit algorithm, which focuses on deployment of promising (by extrapolation) frameworks.
Lower scores for same amount of resources and/or more time and/or hardware resources needed for same score.
The user could choose only one framework and only invoke training for a given problem on one framework (via framework API). This would likely result in the best models (highest score) not being found or used.

In the following, embodiments of HAMLET are described along with experimental results demonstrating the improvements in performance and advantages provided thereby. For example, providing for automated algorithm selection and hyperparameter tuning facilitates the application of machine learning. HAMLET outperforms traditional multi-armed bandit strategies which look to the history of observed rewards to identify the most promising arms for optimizing expected total reward in the long run. The inventors have recognized that, when considering limited time budgets and computational resources, these traditional strategies apply a backward view of rewards which is inappropriate as the bandit does not look into the future for anticipating the highest final reward at the end of a specified time budget. In contrast, HAMLET extends the bandit approach with learning curve extrapolation and computation time awareness for selecting among a set of machine learning algorithms. In experiments with 99 recorded hyperparameter tuning traces from prior work, all studied HAMLET variations exhibit equal or better performance than other bandit-based algorithm selection strategies. The best performing HAMLET variant combines learning curve extrapolation with the well-known upper confidence bound exploration bonus. In total, that variant achieves a lower mean rank than all non-HAMLET policies with statistical significance at the 95% level.

HAMLET allows to select the base learner to be applied to a dataset. In an embodiment, an iterative approach is modeled to select the base learner and the optimization of its hyperparameters as a hierarchical problem. A multi-armed bandit focuses on selecting the base learner, and a specialized component (also referred to as the tuner) is responsible for tuning that respective base learner's hyperparameters. This approach is easily extensible with base learners by integrating them as additional arms. HAMLET applies to realistic settings where AutoML faces a limitation of resources such as available computational power and the time available to solve the machine learning problem. The following discussion addresses the extreme case of a single CPU available for solving a machine learning task within a strict wallclock time budget. In this setting, the traditional multi-armed bandit's approach is not optimal as it requires to observe a complete function evaluation, i.e., training a parametrized base leaner on the dataset, for being able to update the associated arm's statistics. Additionally, most multi-armed bandit algorithms assume stationary reward distributions, which usually is not true as tuning algorithms increase in achieved performance over time. Finally, the typical AutoML setting would like to achieve the maximum possible performance, not maximize the average reward sums over several repeated trials. HAMLET provides an improved multi-armed bandit approach by accounting for time explicitly, and by learning the different arm's learning curves and extrapolating them to the end of the wallclock time budget under consideration of computation already spent on each arm. The combination of learning curve extrapolation and accounting for computation time improves the performance of multi-armed bandits in algorithm selection problems.

The empirical evaluation discussed in the following uses the 99 sets of traces for six different base learners. The evaluation shows that even simple approaches to learning curve fitting provide gains for regimes of tight time budgets. Overall, the best performing HAMLET variant achieves with 95% confidence a better performance than all non-HAMLET bandits used in the experiments.

The basic form of the multi-armed bandit problem can be described as follows: An agent is faced repeatedly with a choice among I different actions. After each choice, the agent receives a numerical reward chosen from a stationary probability distribution that depends on the selected action. The objective is to maximize the expected total reward over some time period or time steps. Through repeated action selections, the agent can maximize the winnings by concentrating on the best arms. If the estimates of the action values are maintained, there is at least one action at any time step whose estimated value is largest, the greedy action(s). When one of them is selected, this is called exploitation. If a non-greedy action is selected, it is called exploration, as it allows to improve the estimate of the non-greedy action's value. Exploration is needed because there is always uncertainty about the accuracy of the action-value estimates. The greedy actions are those that look best at present, but some of the other actions may actually be better.

A simple exploration technique would be to behave most of the time greedily, but with small probability $\in$, instead select randomly from among all the actions with equal probability, independently of the action-value estimates. That method is called '$\in$-greedy'. An advantage of the $\in$-greedy is that as the number of time steps increases, the bandit will sample every action an infinite number of times. Therefore, the bandit's action value estimates will converge to the accurate values. Commonly, $\in$-greedy action selection forces the non-greedy actions to be tried, but indiscriminately. Another technique denoted decaying $\in$ initializes $\in$ high and decreases $\in$ (and thus the rate of exploration) over time.

Another effective way of selecting among the possible actions is the Upper Confidence Bound (UCB) method. It selects actions according to their potential for being optimal. UCB does so by taking into account both their respective value estimates and the uncertainties in those estimates where actions with lower value estimates, or that have already been selected frequently will be selected with decreasing frequency over time. UCB bandits select actions based on the upper bound of what is reasonable to assume as the highest possible true value for each action. Each time an action is selected, the epistemic uncertainty in the action value estimate should decrease. On the other hand, each time another action is selected, the epistemic uncertainty increases. One difficulty of UCB bandits is in dealing with non-stationary problems.

The multi-armed bandit problem presented and addressed in accordance with embodiments of the present invention differs from the original problem as rewards are not stationary. When performing algorithm selection, the rewards should increase the more time is spent on the arm, whereas the rate of improvement is unknown. The objective is not to maximize the total reward, but to find the single best reward.

Auto Tune Models (ATM) is a distributed, collaborative, scalable AutoML system, which incorporates algorithm selection and hyperparameter tuning. ATM approaches AutoML by iterating two steps: hyperpartition selection followed by hyperparameter tuning. A hyperpartition includes one specific base learner, as well as its categorical hyperparameters. ATM models each hyperpartiton selection as a multi-armed bandit problem. ATM supports three bandit algorithms: the standard UCB-based algorithm (called UCB1), and two variants designed to handle drifting rewards as encountered in the AutoML setting. The variants designed for drifting rewards compute the value estimates for selecting the actions either based on the velocity or the average of the best K rewards observed so far (denoted BestK-Velocity and BestK-Rewards, respectively). Once a hyperpartition has been chosen, the remaining unspecified parameters can be selected from a vector space using, for example, Bayesian Optimization. The Machine Learning Bazaar framework for developing automated machine learning software systems extends the work of ATM and incorporates the same bandit structures. HAMLET differs from both in multiple ways. First, it does not choose between hyperpartitions, but solely between base learners, and therefore does not select categorical hyperparameters. Second, HAMLET uses a novel bandit algorithm which fits a simple model of the learning curve to observed rewards, but selects the action based on an extrapolation of the learning curve to find the highest possible reward given a time budget. Third, ATM and the Machine Learning Bazaar update the action value statistics based on completed function evaluations, i.e., a base learner's test performance after training it on the dataset. In contrast, an embodiment of HAMLET updates training statistics in configurable time intervals. Even if a base learner's tuner did not manage to find better models in a recent time interval, an embodiment of HAMLET tracks (the lack of) progress of the tuner's learning curve, allowing it to switch computing resource assignments based on extrapolating learning curves.

Hyperband is a bandit-based early-stopping method for sampled parametrizations of base learners. It incorporates a bandit that deals with the fact that arms in hyperparameter optimization might improve when given more training time. Hyperband builds on the concept of successive halving: it runs a set of parametrized base learners for a specific budget, evaluates their performances, and stops the worse performing half of the set. When presented with a larger set of possible parametrizations of base learners, Hyperband stops parametrizations that do not appear promising and assigns successively more computational resources to the promising ones that remain. HAMLET differs in that it assigns computational resources based on predicted performance and not the past performance so far. In an embodiment of HAMLET, the bandit is used to decide which algorithm to run, and not which hyperparameter setting to run. Also, the approach to assign budget is different. Hyperband applies the concept of a geometric search to assign increasing portions of the overall budget to a decreasing number of base learner parametrizations. In contrast, an embodiment of HAMLET continues a chosen tuner for a configured time interval. After the interval, the tuner reports updates for the best found models, if any, and HAMLET updates the respective tuner's learning curve.

The term "learning curve" is used to describe (1) the performance of an iterative machine learning algorithm as a function of its training time or number of iterations and (2) the performance of a machine learning algorithm as a function of the size of the dataset it has available for training. For the AutoML challenge addressed by an embodiment of HAMLET, the focus is on extrapolating the former type of learning curves.

It is possible to target hyperparameter optimization of Deep Neural Networks (DNN) using a probabilistic model to extrapolate the performance from the first part of a learning curve for a hyperparameter configuration. For this, a set of parametric functions can be fit for each hyperparameter configuration and combined into a single model by weighted linear combination. Using a Markov Chain Monte Carlo method yields probabilistic extrapolations of the learning curve. Those probabilistic extrapolations are then used for automatic early termination of runs with non-promising hyperparameter settings. It is also possible to extrapolate learning curves for hyperparameter settings and architectures of DNN. Relying on a Bayesian Neural Network (BNN) in combination with known parametric functions, samples as promising candidates to apply Hyperband to can be found. Predicting the model parameters of parametric functions as well as the mixing weights with the BNN enables transferring knowledge of previously observed learning curves. However, that implies that previous learning curve information is needed to pre-train the BNN for good and fast performance.

A method known as Freeze-Thaw optimization is a Gaussian process-based Bayesian optimization technique for hyperparameter search. The method includes a learning curve model based on a parametric exponential decay model. A positive definite covariance kernel is used to model the iterative optimization curves. The Freeze-Thaw method maintains a set of partially completed but not actively trained models and uses the learning curve model for deciding in each iteration which ones to 'thaw', i.e. to continue training.

A regression-based extrapolation model can be used for the extrapolation of learning curves to speed up hyperparameter optimization. The technique is based on using trajectories from previous builds to make predictions of new builds, where a 'build' refers to a training run with a specific base learner parametrization. Therefore, it is possible to transform data from previous builds and add a noise term to match the current build and to extrapolate its performance. This extrapolation capability can server to identify and stop hyperparameter configurations early.

An embodiment of HAMLET uses a less sophisticated learning curve function to demonstrate the general nature of benefits derived from moving from a backward to a forward-looking multi-armed bandit for algorithm selection. Also, an embodiment of HAMLET provides a general approach, not limited to a specific type of base learner such as DNN. In demonstrating the effectiveness of an embodiment of HAMLET, previous learning curves were not relied on. While a transfer of information from previous learning curves is clearly beneficial, this demonstrates that HAMLET improves algorithm selection performance due to a simple learning curve extrapolation, not due to a transfer and reuse of previous information. In an embodiment, HAMLET uses information only from the current AutoML problem. Also, an embodiment of HAMLET extrapolates learning curves for the performance of base learners' tuners and not individual hyperparameter configurations.

Table 2 below provides a list of symbols and notations used in the following to further describe possible embodiments of HAMLET.

TABLE 2

| Symbol | Description |
| --- | --- |
| B | overall Budget given |
| $B_{rem}$ | remaining time budget |
| $\epsilon_1$ | HAMLET Variant 1: chance to pick the tuner with the second highest learning curve |
| $\epsilon_2$ | HAMLET Variant 1: chance to pick a tuner at random |
| $\epsilon(t)$ | HAMLET Variant 2: chance to pick a tuner at random, time dependent |
| I | number of arms |
| $LC^i$ | Learning Curve Function for arm i, e.g. using Eq. (1) |
| r | vector of predicted reward of all arms when budget runs out |
| $\hat{r}^i, \hat{r}$ | $r^i$, resp. r, after applying UCB bonus Eq. (2) |
| $\rho$ | HAMLET Variant 3: UCB exploration bonus scaling factor |
| $\Delta t$ | time interval for HAMLET's main loop in algorithm 1 |
| $t_x^i$ | execution time of arm i spent until now |
| $r^i$ | predicted reward of arm i when budget runs out |
| $[x^i, y^i]$ | so far Learning Curve values for arm i |
| $x^i$ | training time to reach $y^i$ for arm i |
| $y^i$ | accuracy values for arm i |

According to embodiments of HAMLET, the AutoML algorithm selection problem is modelled as a multi-armed bandit problem, where each arm represents a hyperparameter tuner responsible for one specific base learner. At each iteration, HAMLET chooses which action to take, i.e., selects the arm to pull, based on extrapolations of the arms' learning curves as described below in and outlined in Algorithms 2 and 3. After deciding on the action, the bandit continues the execution of the corresponding hyperparameter tuner for a pre-configured time interval Δt. When the interval elapses, execution of the arm is paused and can be resumed at that point in later iterations without loss of information. During execution of the arm in the time interval, the bandit receives all monotonically increasing accuracy values reached in that time interval as well as information about when these accuracies were reached (i.e., the updated so-far learning curve). When the tuner did not find new monotonically increasing accuracy values in that time interval, this information is also incorporated. The bandit then fits a parametric curve to match the learning curve and reduces the remaining budget by Δt. Subsequently, HAMLET continues to the next iteration. When HAMLET faces a new AutoML problem, it tries arms preferably in a Round Robin fashion until it has collected enough values to model learning curves for each arm.

Figure 3:
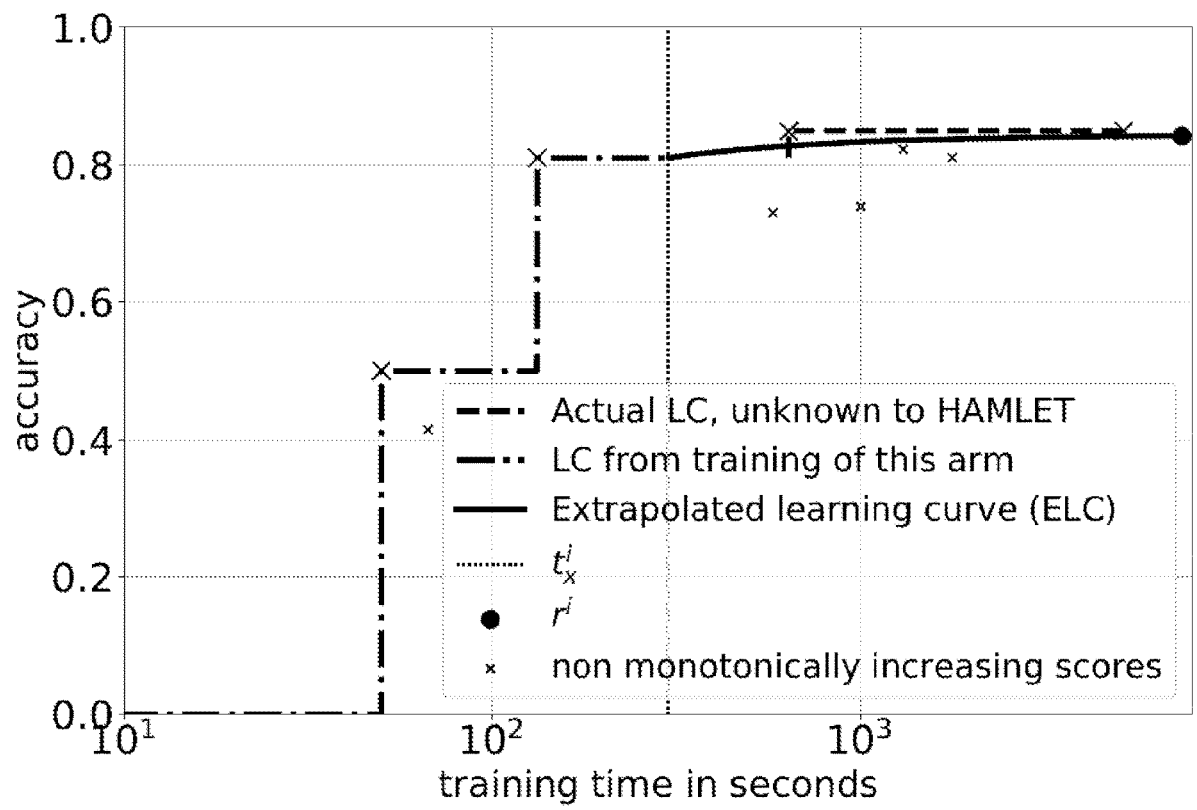
FIG. 3 is an exemplary graph showing how a learning curve (LC) is extrapolated based on observed learning curve values according to an embodiment of the present invention.

Learning Curve Extrapolation: According to embodiments of HAMLET, learning curves are modelled as the accuracy found by a tuner (y) over training time (x) in seconds. Here, training time includes the time spent on executing the tuner for identifying parametrizations of the base learner and training the parametrized base learner on the dataset. In HAMLET, the learning curve is defined as a monotonically increasing function defined by the maximum accuracies found over training time. An example graph to demonstrate learning curve extrapolation is shown in FIG. 3. In this example, training of the arm has been running for 500 seconds, where the maximum training time of this arm is marked by a vertical line. The accuracy values found up until this point are used to fit a curve, in order to predict future accuracy values over time. From the accuracy scores found by this tuner, only monotonically increasing values are used for the learning curve, and other scores are ignored. For comparison reasons, the actual future learning curve is also shown, since this is the ground truth for the extrapolated learning curve but unknown to the HAMLET bandit. An embodiment of HAMLET targets to optimally use the specified time budget B and find the base learner achieving highest accuracy by devoting most computational resources to its corresponding tuner. Therefore, HAMLET attempts to predict the maximally attainable accuracy for each tuner. It does so by extrapolating each tuner's learning curve assuming that all remaining budget $B_{rem}$ was spent on it. Considering that each tuner i has already received an amount of training time time $t_x^i$, HAMLET uses the tuner's learning curve to predict the accuracy at $x=t_x^i+B_{rem}$, in FIG. 3 illustrated by a marker.

To investigate if learning curve extrapolation is a meaningful concept for the algorithm selection problem in constrained computational settings, a straightforward parametric function is used to model the tuners' observed accuracies over time. In the problem setting according to embodiments of HAMLET, learning curves are known to be (1) monotonically increasing, (2) saturating functions with (3) values $y \in [0, 1]$. Because of the similar shape and possible fulfillment of prerequisites (1)-(3), it is chosen according to an embodiment to use an arctangent function with four parameters (a, b, c, d) to translate, stretch and compress for this first set of investigations:

$$y = a \cdot \arctan(b(x+c)) + d \quad (1)$$

where scikit-learn's curve fit function are used to fit the parameters of the desired curve.

HAMLET Variants: HAMLET faces the same exploration/exploitation dilemma as other multi-armed bandit strategies. In the following, three variants of how HAMLET chooses the arm to be run in the next iteration are described. In each, the decision is based on the values of the vector r containing for each arm i the accuracy predicted by extrapolating the learning curve to time $x=t_x^i+B_{rem}$, $r^i$. The three variants are outlined in Algorithm 3.

HAMLET Variant 1—Double $\in$-greedy Learning Curve Extrapolation with Fixed $\in_1$ and $\in_2$: In this approach, HAMLET acts in an $\in$-greedy fashion based on the extrapolation of learning curves. After observing in preliminary experiments that often a subset of the tuners perform much better than the rest, the standard $\in$-greedy bandit was modified as follows: With chance $\in_2$, HAMLET chooses an action at random. With chance $\in_1$, HAMLET chooses the tuner with the second highest predicted accuracy. With chance $1-(\in E_1 +\in_2)$, HAMLET takes the greedy action, i.e., argmax(r).

HAMLET Variant 2—$\in$-greedy Learning Curve Extrapolation with Decaying $\in$: In this approach, HAMLET acts in an $\in$-greedy fashion based on the extrapolation of learning curves. The variant starts with $\in(t)=1$ and reduces it in $$\frac{B}{\Delta t}$$

iterative steps to $\in(B)=0$, where the notation $\in(t)$ denotes the stochastic exploration parameter's time dependence. At each iteration, HAMLET chooses an action at random with chance the current $\in(t)$. With chance $1-\in(t)$, HAMLET takes the greedy action.

HAMLET Variant 3—Learning Curve Extrapolation with Exploration Bonus: This variant adds for each arm a scaled UCB-based exploration bonus to the learning curve predictions to compute a score as follows:

$$\hat{r}^i = r^i + \rho\sqrt{\frac{2\log n}{\log n^i}}, \rho \geq 0, \quad (2)$$

where n is the number of total iterations, $n^i$ is the number of times arm i has been pulled and $\rho$ is the scaling factor of the exploration bonus. At each iteration, HAMLET chooses the arm with maximum $\vec{r}^i$, i.e. argmax($\vec{r}$).

Algorithm 2: Algorithm selection based on learning curve extrapolation.

Data: Overall budget B
$B_{rem} = B$
while $B_{rem} > 0$ do
 if First iteration then
  for each arm i = 1,..., I do
   [$x^i$, $y^i$] = TrainAndObserveLC(i, $\Delta$t), where
   [$x^i$, $y^i$] describes the learning curve values
   Observed so far
  end
 else
  NextArm = MasterChooseNextArm(r) ;
  [$x^i$, $y^i$] = TrainAndObserveLC(NextArm, $\Delta$t),
  where [$x^i$, $y^i$] describes the learning curve values observed so far
 end Algorithm 2: Algorithm selection based on learning curve extrapolation.

for each arm i = 1,..., I do
 $LC^i$ = ScikitLearn.Curve_Fit(Eq. (1), [$x^i$, $y^i$]);
 $r^i = LC^i(t_x^i + B_{rem})$
end
r = [$r^1$, $r^2$, ... , $r^I$] ;
$B_{rem}$ = UpdateBudget( ) ;
end Algorithm 3: MasterChooseNextArm Data: Vector r with predicted accuracy for all arms at end of budget
This includes 3 Variants ;
if Variant 1 then
 with probability $(1 - (\epsilon_1 + \epsilon_2))$: na = argmax(r);
 with probability $(\epsilon_1)$: na = second argmax(r);
 with probability $(\epsilon_2)$: na = random(1, ... , I);
else if Variant 2 then
 with probability $(1 - \epsilon(t))$ : na = argmax(r);
 with probability $(\epsilon(t))$ : na = random(1, ... , I);
 where $\epsilon(t)$ linearly decreases with incr. time t;
else
 calculate $\hat{r}$ by applying Eq. (2) to all arms;
 na = argmax $\hat{r}$ ;
end
Return Nextarm = na Traces of experiments (see Mischa Schmidt, et al., "On the Performance of Differential Evolution for Hyperparameter Tuning," arXiv;1904.06960v1, (Apr. 15, 2019)) which executed hyperparameter tuning for six base learners by an evolutionary strategy were used and are referred to in the following discussion. Running different algorithm selection policies on the recorded experiment traces allows evaluating different bandit policies based on a ground truth. The traces are from classification datasets. Equation (1) above can be adjusted for other datasets, such as regression datasets.

Computational Resources and Setup: Each tuner (and base learner) was executed in a single docker container with only a single CPU core accessible. Parallel execution of different experiments was limited to ensure that a full CPU core was available for each docker container. There was no limit on memory resource availability. An embodiment of HAMLET evaluated in the following executes the bandit logic also in docker containers constrained to a single CPU core. The execution was limited different experiment runs to ensure each docker container has access to one full CPU core.

Datasets, Base Learners and Hyperparameter Tuners: Referring to the traces from the experiments used and discussed in the following, algorithm selection was performed for the 49 small (OpenML datasets: {23, 30, 36, 48, 285, 679, 683, 722, 732, 741,752, 770, 773, 795, 799, 812, 821, 859, 862, 873, 894, 906, 908, 911, 912, 913, 932, 943, 971, 976, 995, 1020, 1038, 1071, 1100, 1115, 1126, 1151, 1154, 1164, 1412, 1452, 1471, 1488, 1500, 1535, 1600, 4135, 40475}) and 10 bigger (OpenML datasets: {46, 184, 293, 389, 554, 772, 917, 1049, 1120, 1128} with five repetitions each) datasets. Table 3 below having the verification experiment parameter sets documents the budgets used for the algorithm selection experiments for the small (denoted Experiment 1) and bigger datasets (denoted Experiment 2). The recorded traces contain the six base learners: k-Nearest Neighbors, linear and kernel Support Vector Machine (SVM), AdaBoost, Random Forest, and Multi-Layer Perceptron.

TABLE 3

| Parameter | Parameter Set |
| --- | --- |
| $\epsilon_1$ | {0.01, 0.05, 0.10, 0.20, 0.40, 0.60} |
| $\epsilon_2$ | {0.00, 0.01, 0.05, 0.10, 0.20, 0.40} |
| ρ | {0.00, 0.05, 0.10, 0.25, 0.50, 0.75, 1.00} |
| K | {3, 5, 7, 10, 20, 50, 100} |
| B (Exp. 1) [s] | {150, 300, 450, 600, 900, 1800, 3600} |
| B (Exp. 2) [s] | {900, 1800, 2700, 3600, 7200, 10800, 21600, 43200} |

Policies and Parametrizations for Comparative Evaluation: For HAMLET variants 1-3, time progresses in intervals of Δt=10 s with the capability to freeze and continue the execution of different arms (e.g., via standard process control mechanisms). For a fair comparison with the other bandit policies, the experiments take the computation time needed for fitting the arms' learning curves into account. This work compares HAMLET variants 1-3 with a simple Round Robin strategy ("Round Robin"), a standard UCB1 bandit ("UCB"), BestK-Rewards ("BestKReward-K", where K refers the parameter choice used) and BestKVelocity ("BestKVelocity-K") policies, leveraging the BTB library. The HAMLET Variant 1 is presented by "MasterLC-$\epsilon_1$-$\epsilon_2$". HAMLET Variant 2 is referred to by "MasterLCDecay" and "MasterLC-UCB-ρ" refers to HAMLET Variant 3. For each parametrizable policy (BestK-Rewards, BestK-Velocity, HAMLET Variants 1 and 3), a simple grid search was ran (see Table 3) to identify the best performing parameter for that policy when considering all datasets and all budgets. This mimics a realistic setting, where the data scientist may not know the optimal policy parametrization beforehand and thus parametrizes based on an educated guess.

Analysis: The highest accuracies achieved by each policy parametrization per dataset within a given budget were compared using boxplots to identify the most promising choices of K, $\epsilon_1$, $\epsilon_2$ and ρ. After identifying each policy's best performing policy parametrizations across the different budgets, they were compared against each other. The intervals of 95% confidence for the policies' mean ranks in these inter-policy comparisons were then calculated. In the Figures discussed below IQR stands for the inter quartile range. The interquartile range represents the middle 50% of the data. It is related to quartiles because it is the difference between the third quartile and the first quartile of the data. In a ranked data set, quartiles are the three values that divide the data set into four equal parts. Each of the four parts contains 25% of the data. Quartile 1 is the smallest quartile. 25% of the data set is below quartile 1 and 75% of the data set is above quartile 1 and so on. In a ranked data set, quartiles are the three values that divide the data set into four equal parts. Each of the four parts contains 25% of the data. Quartile 1 is the smallest quartile. 25% of the data set is below quartile 1 and 75% of the data set is above quartile 1 and so on. In ranking, the results are sorted such that the best result has the lowest rank, second best result hast the second lowest rank, and so on. The worst result has the highest rank. The experimental results are discussed in the following.

Figure 4A:
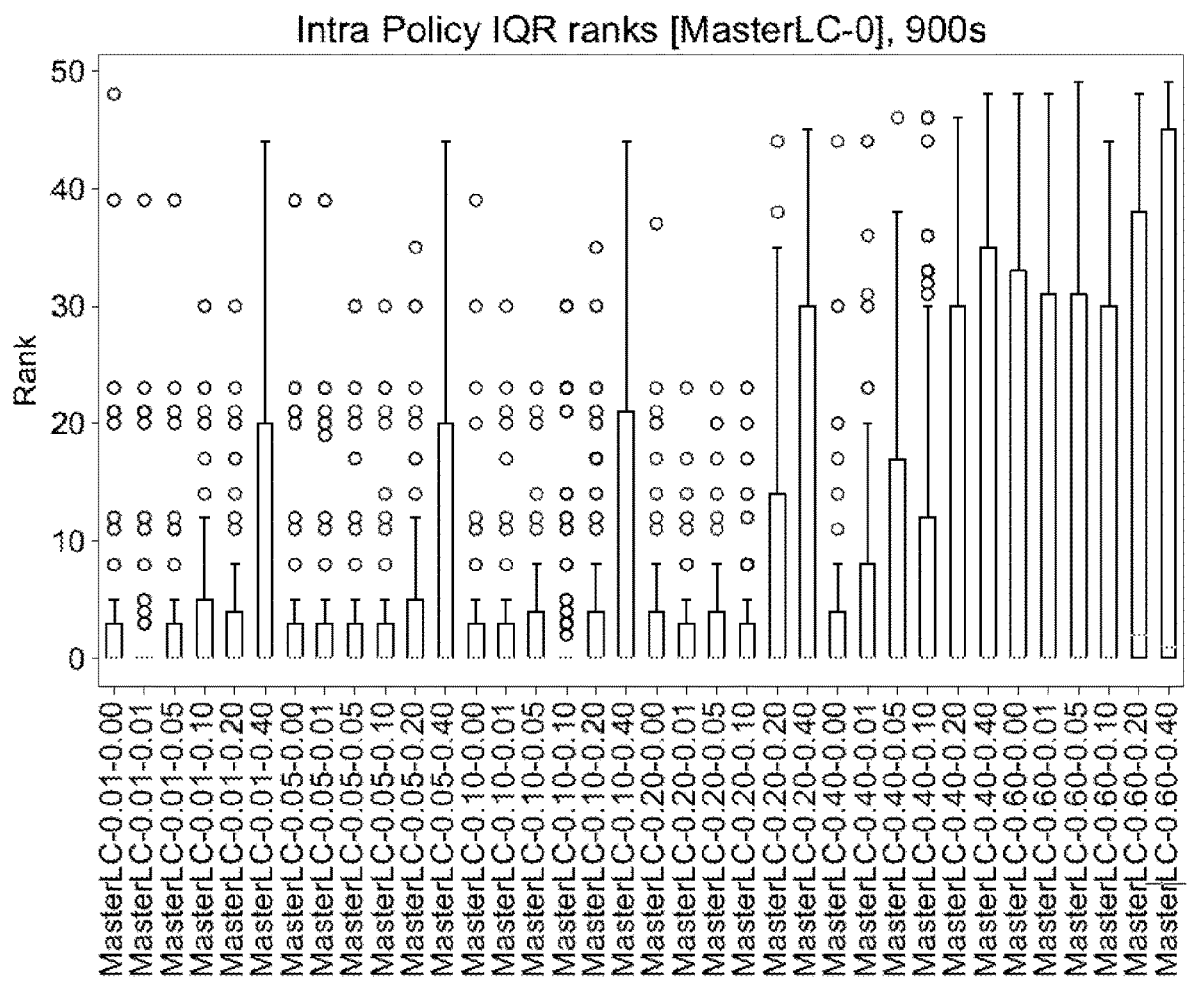
FIGS. 4a, 4b and 4c respectively show a first experiment as boxplots of HAMLET Variant 1 ranks with budgets of 15 minutes (FIG. 4a), 30 minutes (FIGS. 4b) and 1 hour (FIG. 4c), and that, with smaller budgets, the results do not change qualitatively.
Figure 4B:
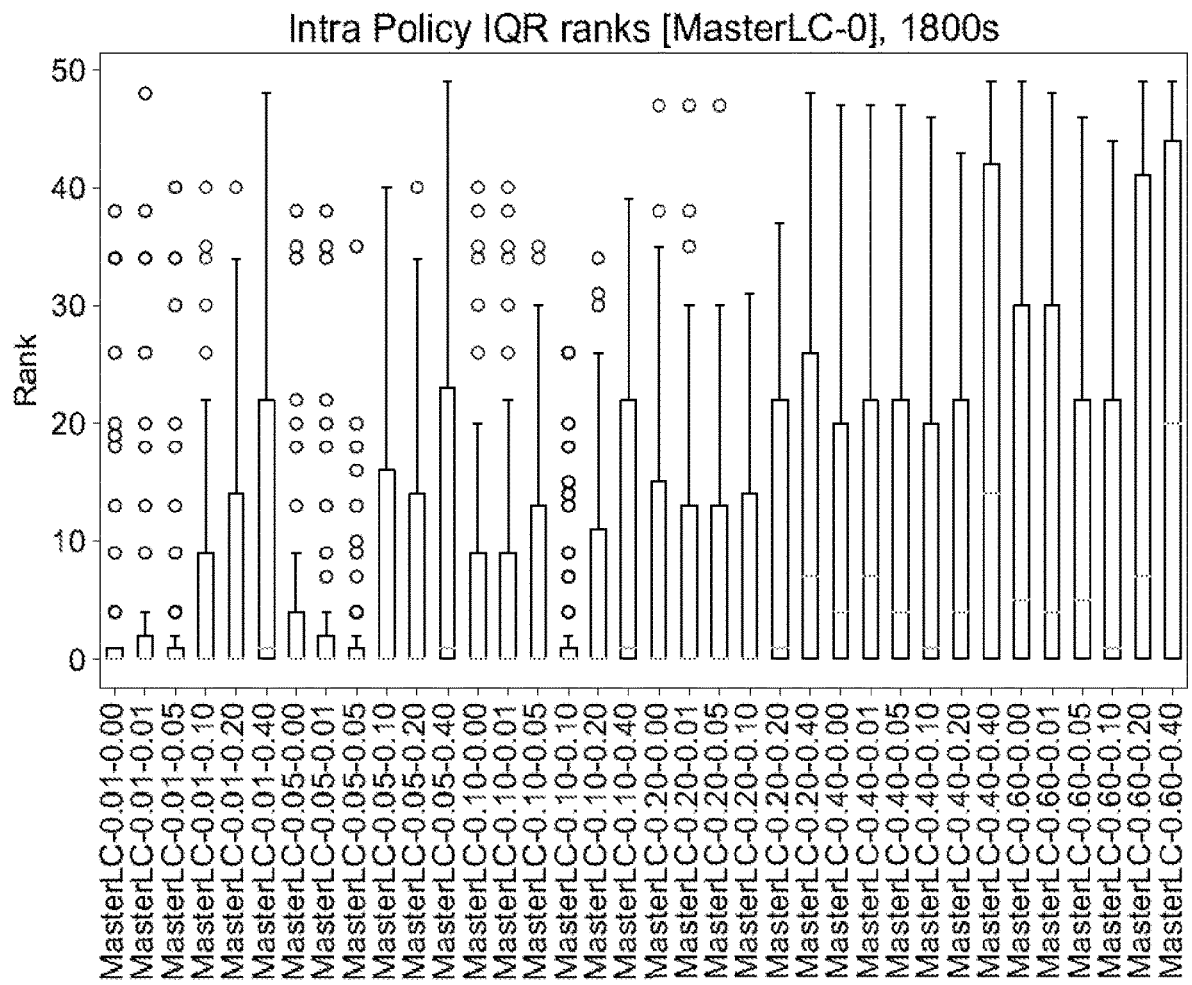
Figure 4C:
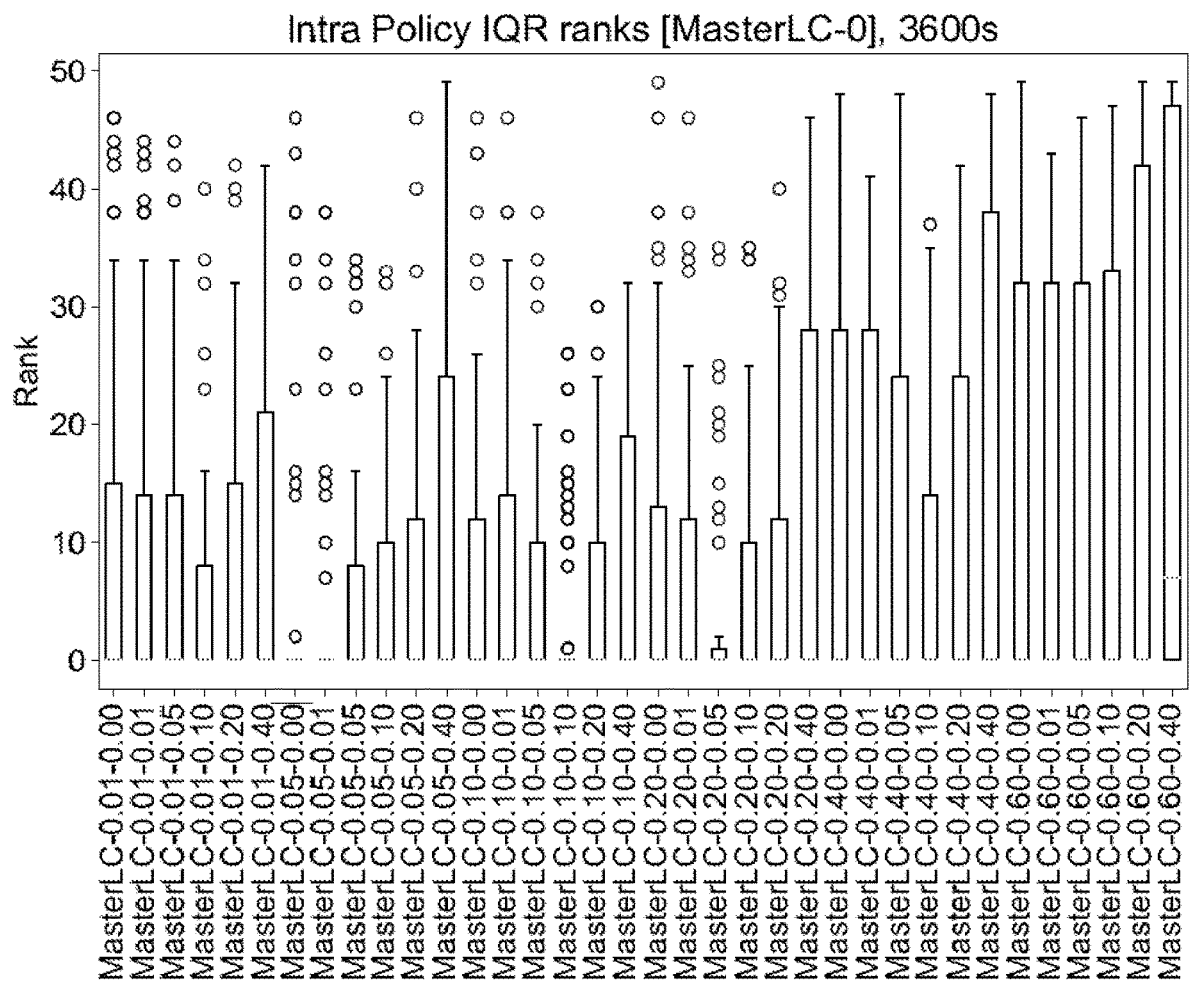
Figure 5A:
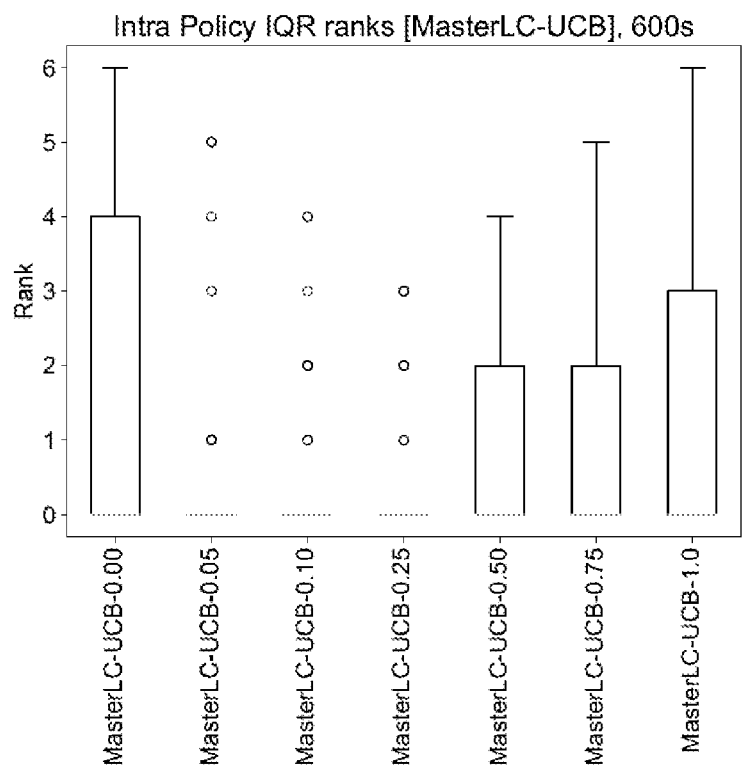
FIGS. 5a, 5b, 5c and 5d respectively show the first experiment as boxplots of HAMLET Variant 3 ranks with budgets of 10 minutes (FIG. 5a), 15 minutes (FIG. 5b), 30 minutes (FIGS. 5c) and 1 hour (FIG. 5d), and that, with smaller budgets, the results do not change qualitatively, (Budget 10 minutes;)
Figure 5B:
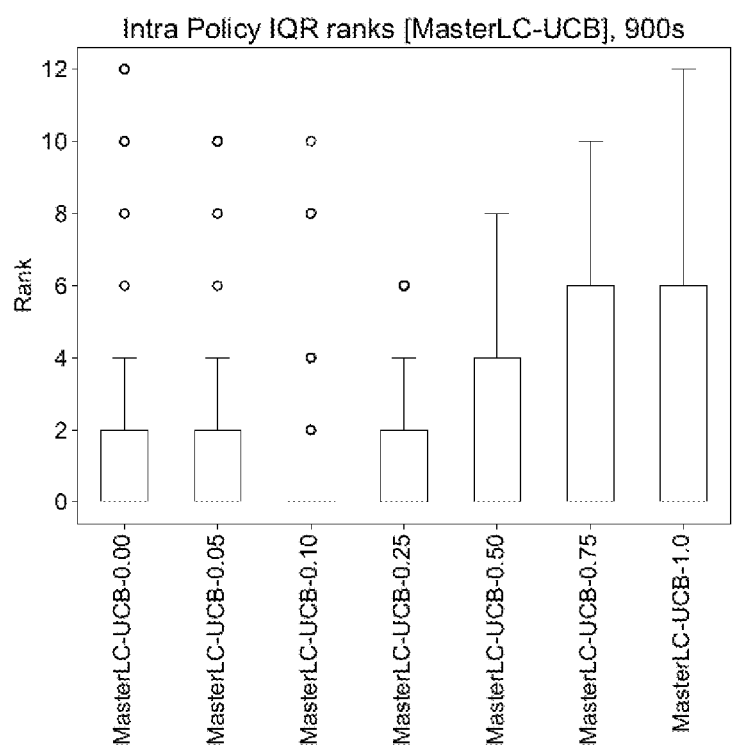
Figure 5C:
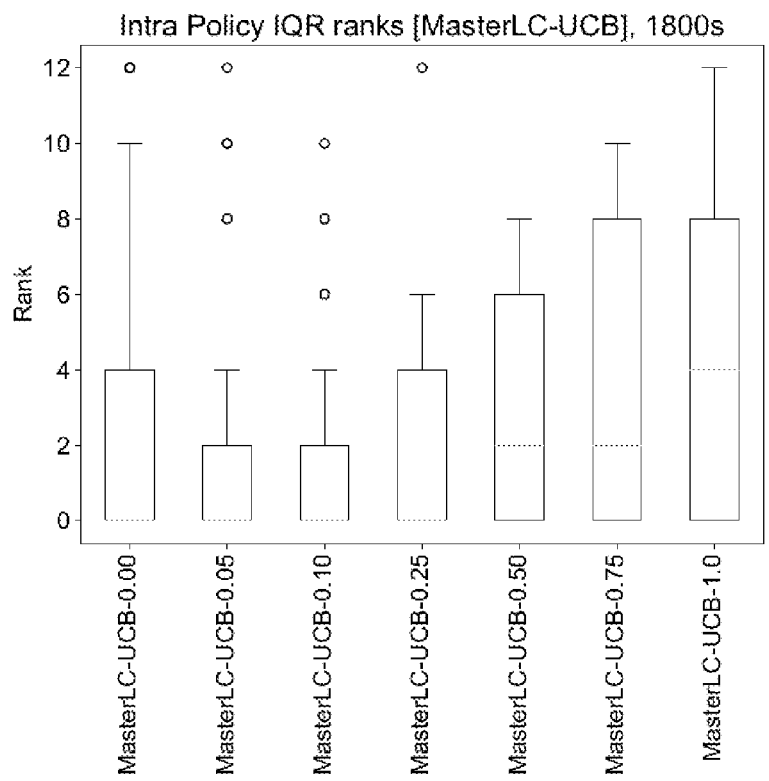
Figure 5D:
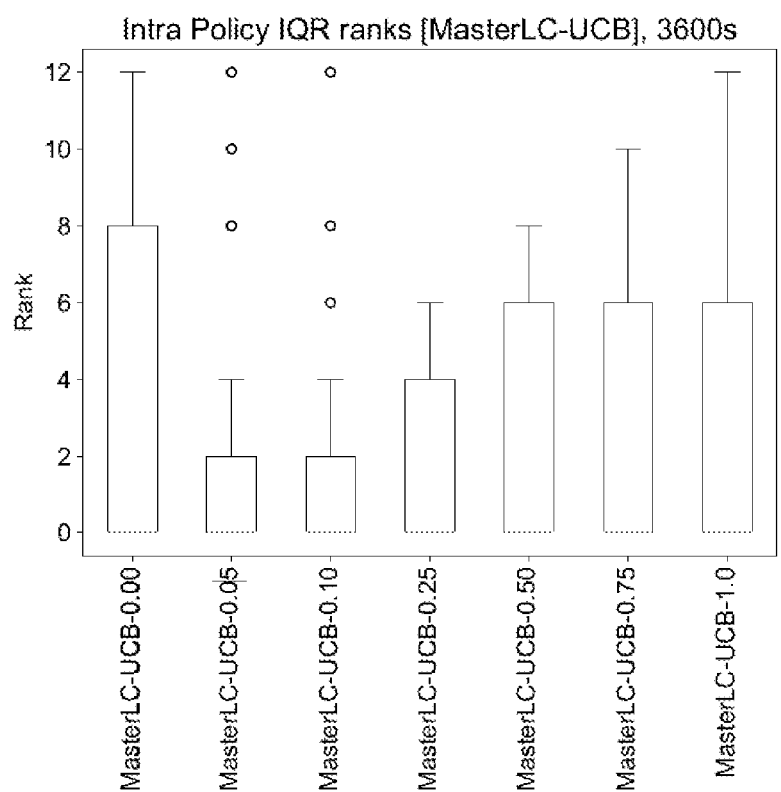

FIGS. 4a, 4b and 4c show boxplots of HAMLET Variant 1 ranks for Experiment 1 and confirm that substantial levels of constant stochasticity, as well as too small levels of stochastic exploration, are detrimental for the performance of Variant 1. $\epsilon_1$=0.1 and $\epsilon_2$=0.1 were selected among the parametrizations performing equally for comparing with other policies. With smaller budgets the results do not change qualitatively.

FIGS. 5a, 5b, 5c and 5d show box plots of HAMLET Variant 3 ranks for Experiment 1 and confirm that medium to large ρ for scaling the UCB exploration bonus is detrimental for the performance of Variant 3, as is deactivating the UCB bonus altogether. ρ=0.05 was selected for comparing with other policies. With smaller budgets the results do not change qualitatively.

Figure 6A:
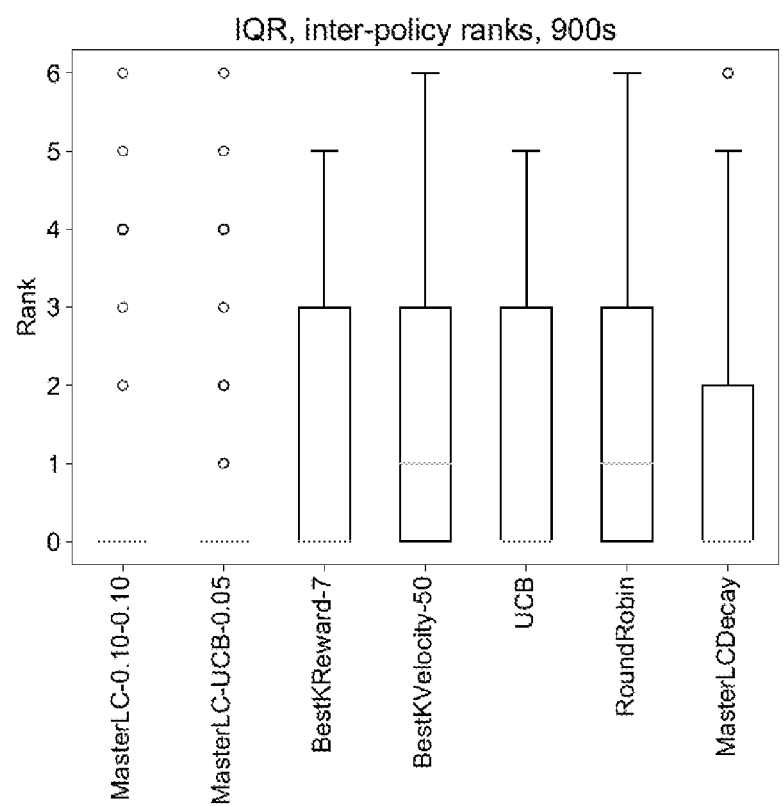
FIGS. 6a, 6b and 6c respectively show the first experiment as boxplots of ranks for inter-policy comparisons with budgets of 15 minutes (FIG. 6a), 30 minutes (FIGS. 6b) and 1 hour (FIG. 6c), and that for B=900 s the policies are statistically indistinguishable.
Figure 6B:
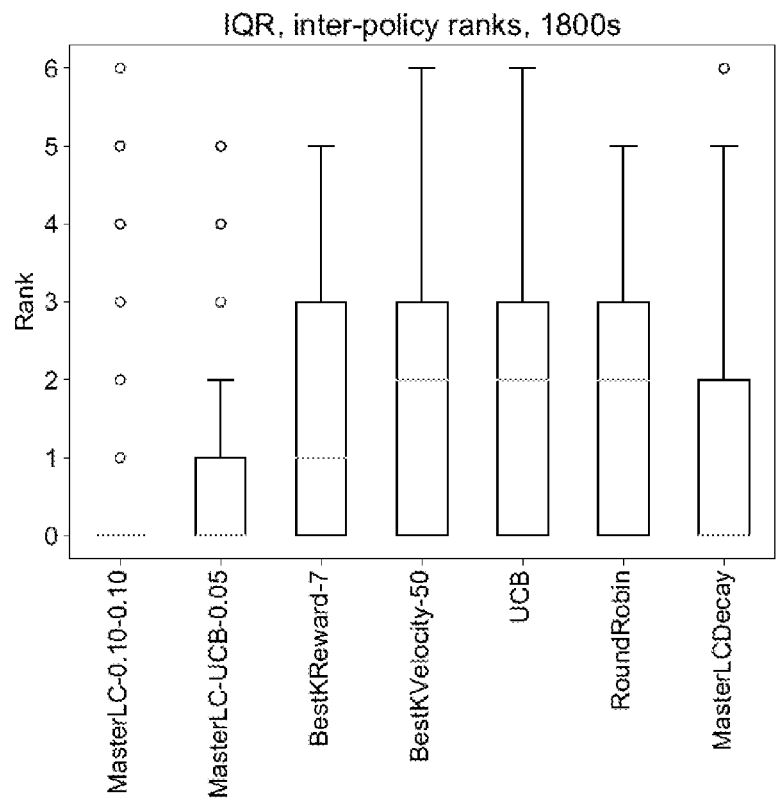
Figure 6C:
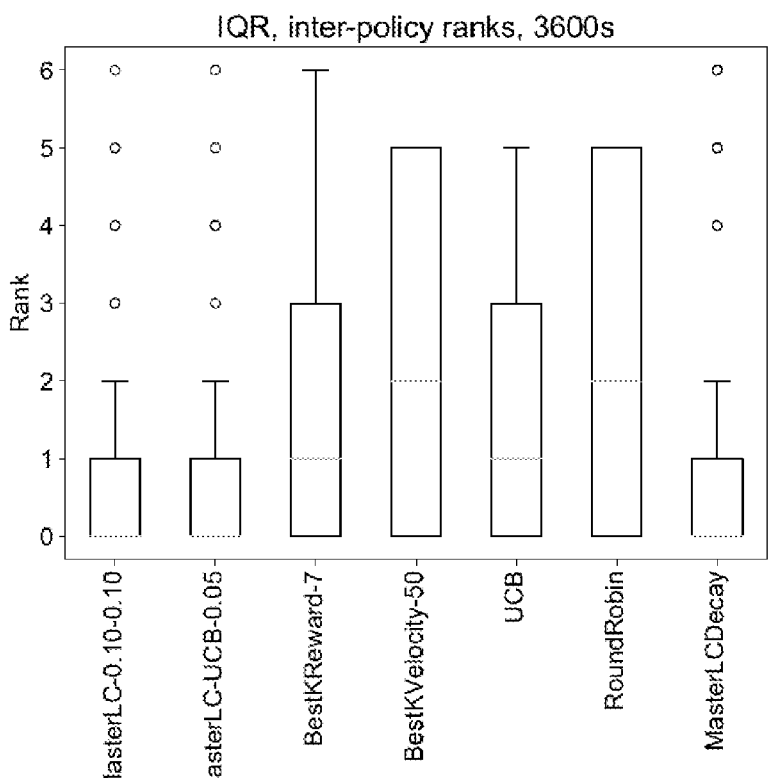
Figure 7A:
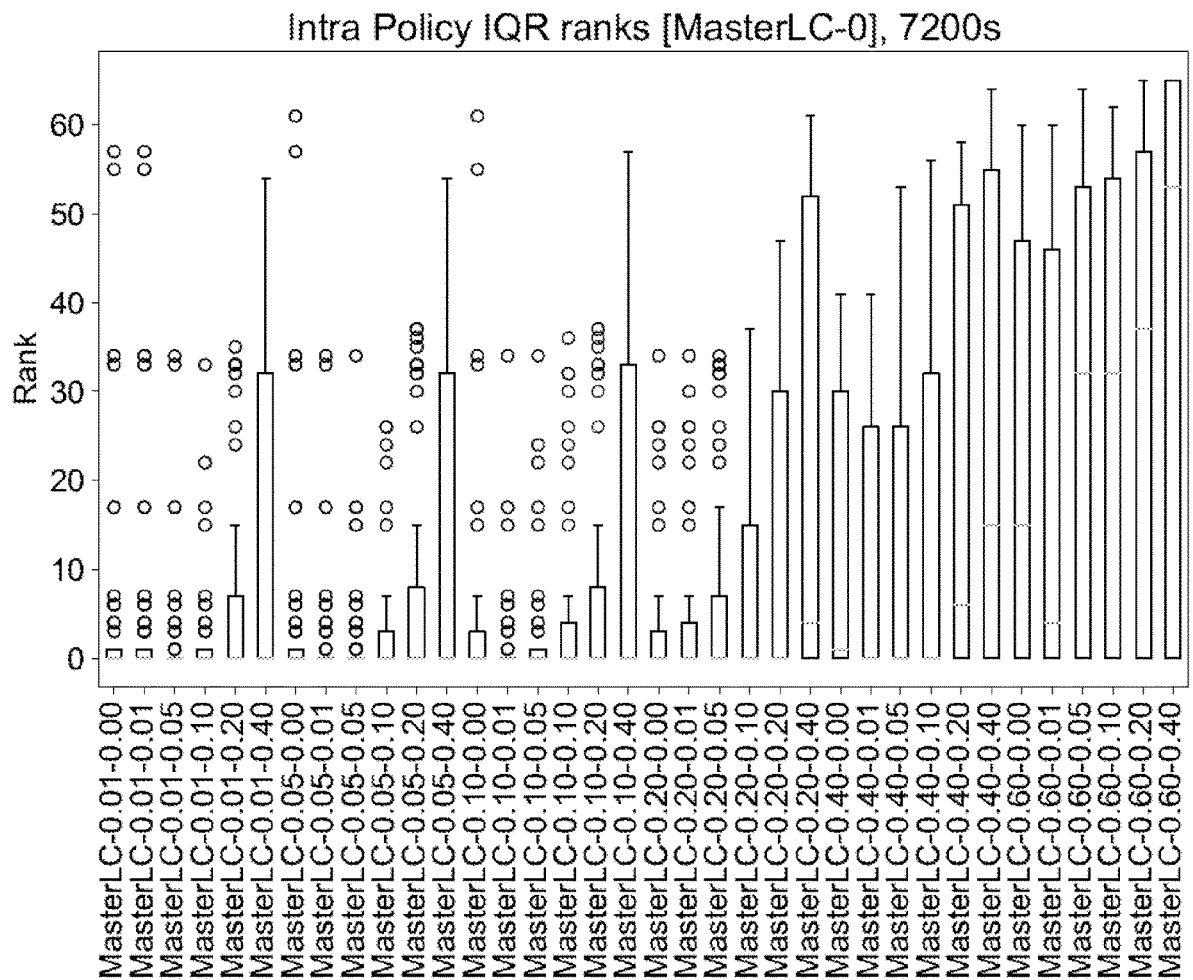
FIGS. 7a, 7b and 7c respectively show a second experiment as boxplots of HAMLET Variant 1 ranks with budgets of 2 hours (FIG. 7a), 3 hours (FIGS. 7b) and 12 hours (FIG. 7c)
Figure 7B:
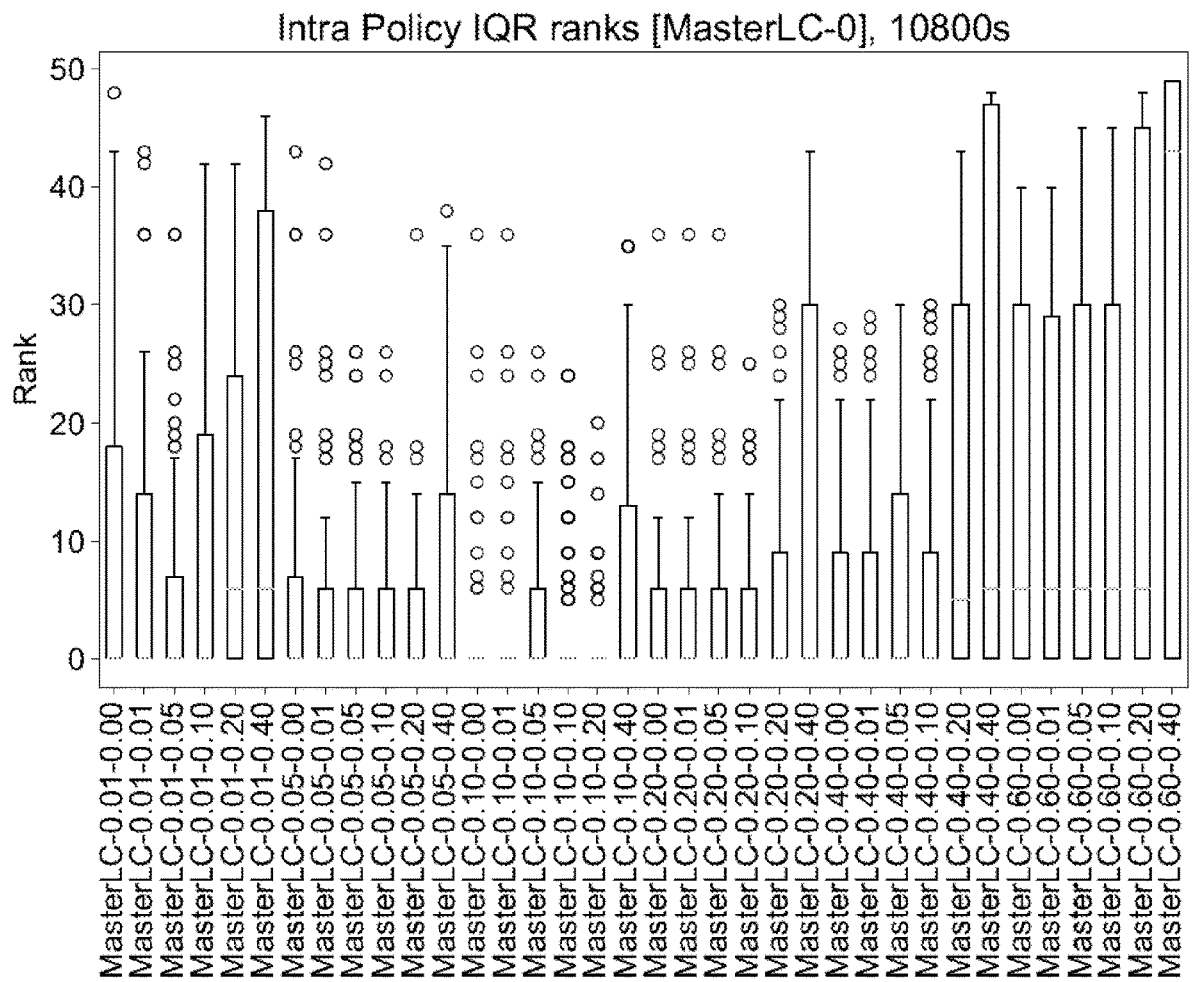
Figure 7C:
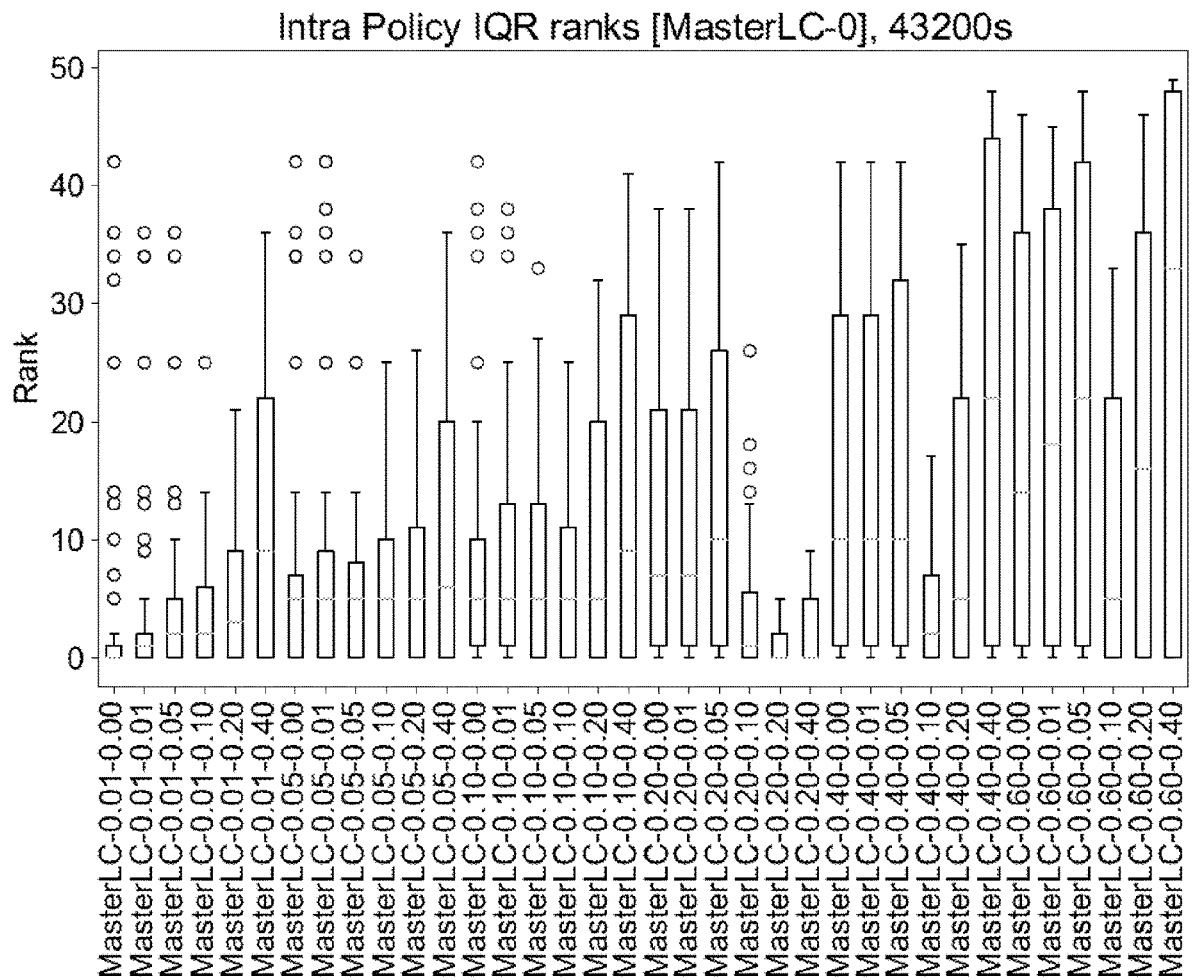
Figure 8A:
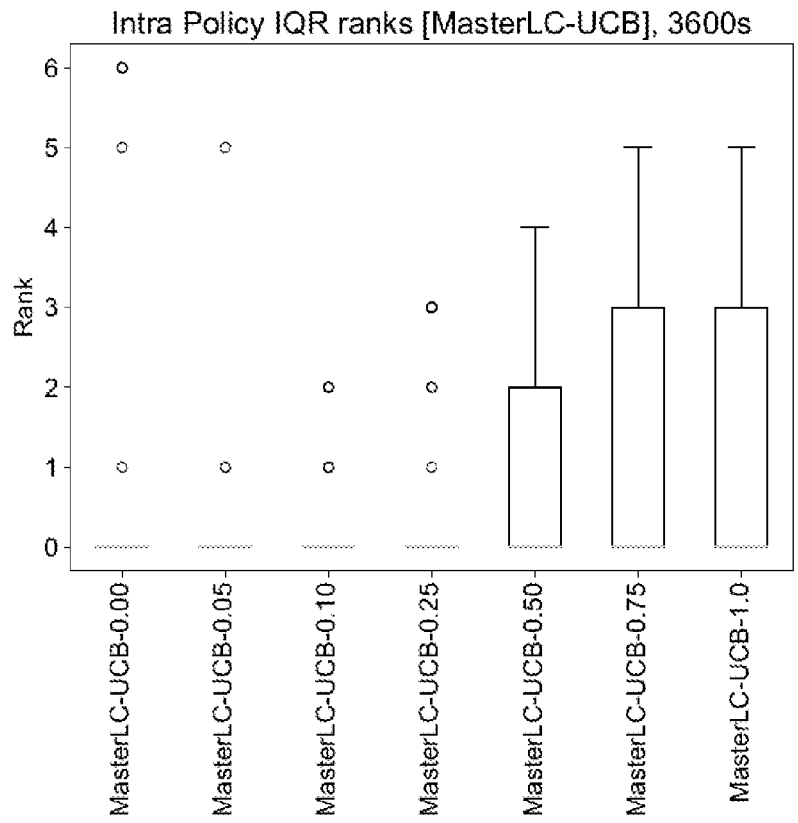
FIGS. 8a, 8b, 8c and 8d respectively show the second experiment as boxplots of HAMLET Variant 3 ranks with budgets of 1 hour (FIG. 8a), 2 hours (FIG. 8b), 3 hours (FIGS. 8c) and 12 hours (FIG. 8d)
Figure 8B:
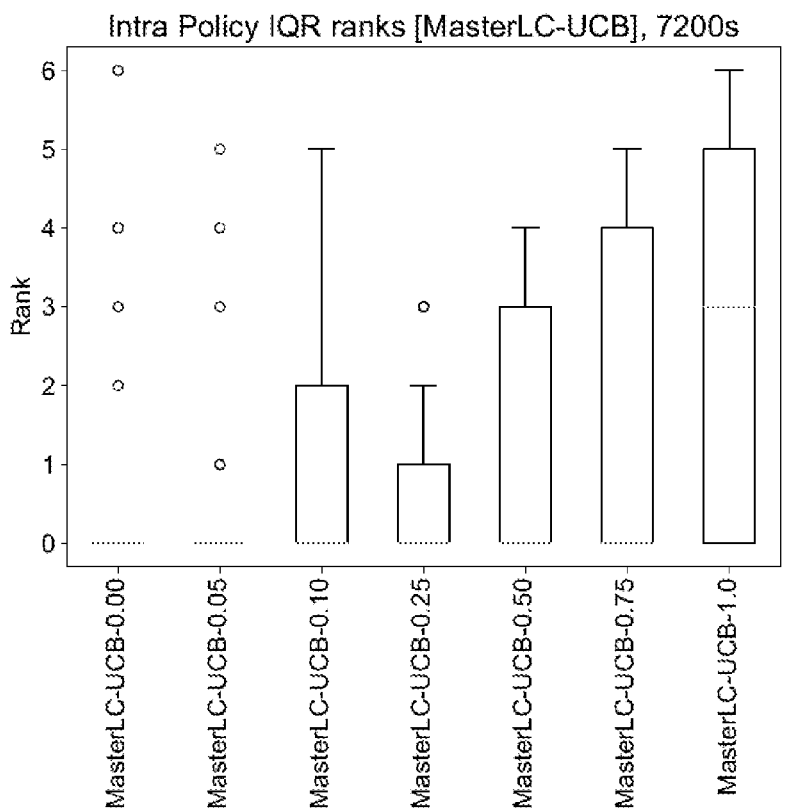
Figure 8C:
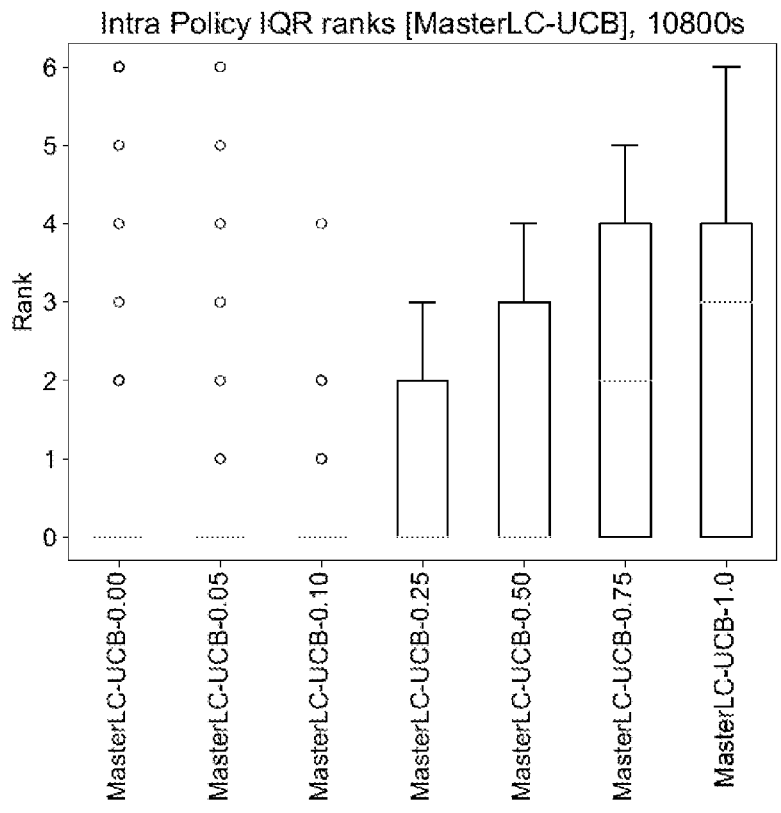
Figure 8D:
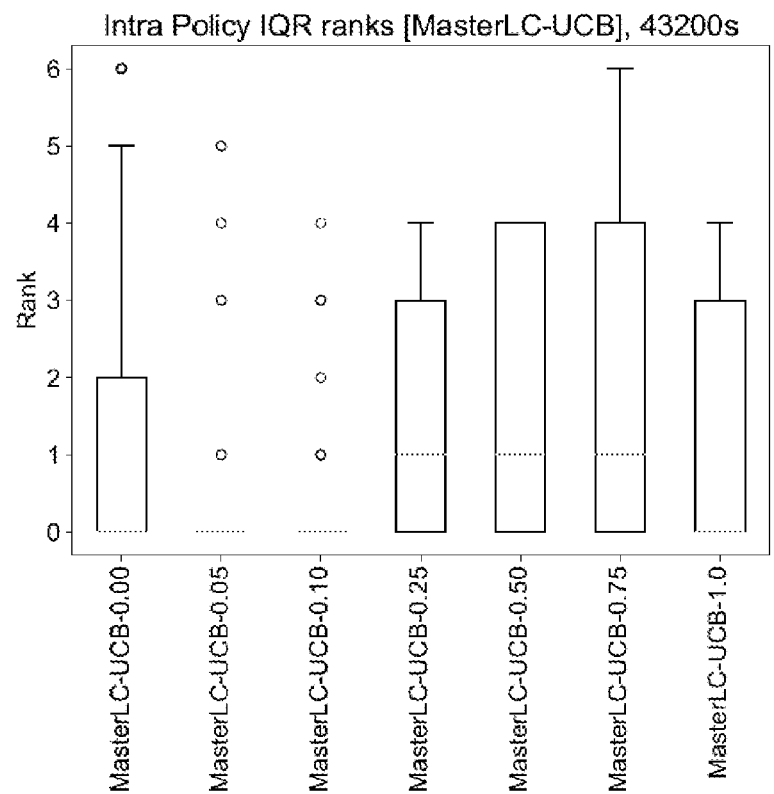
Figure 9A:
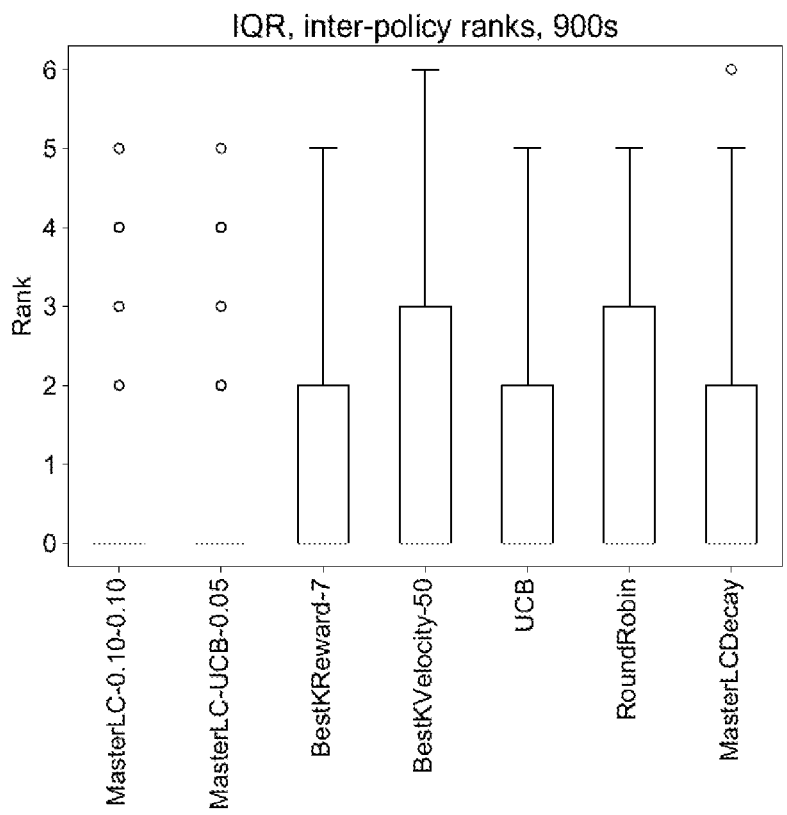
FIGS. 9a, 9b, 9c, 9d, 9e, 9f, 9g and 9h respectively show the second experiment as boxplots of ranks for inter-policy comparisons with budgets of 15 minutes (FIG. 9a), 30 minutes (FIG. 9b), 45 minutes (FIG. 9c), 1 hour (FIG. 9d), 2 hours (FIG. 9e), 3 hours (FIG. 9f), 6 hours (FIGS. 9g) and 12 hours (FIG. 9h)
Figure 9B:
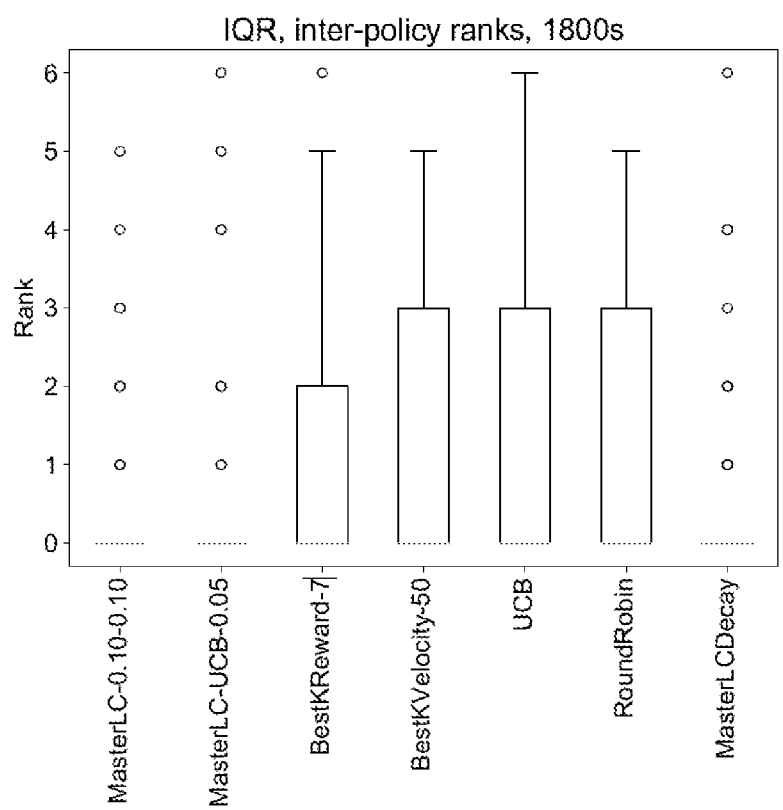
Figure 9C:
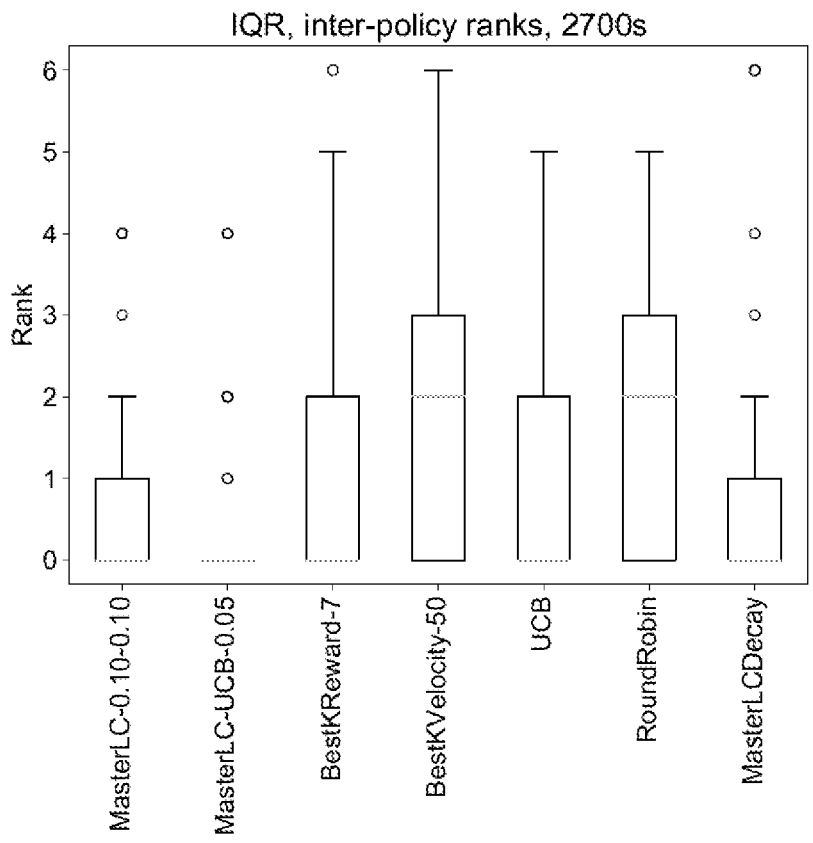
Figure 9D:
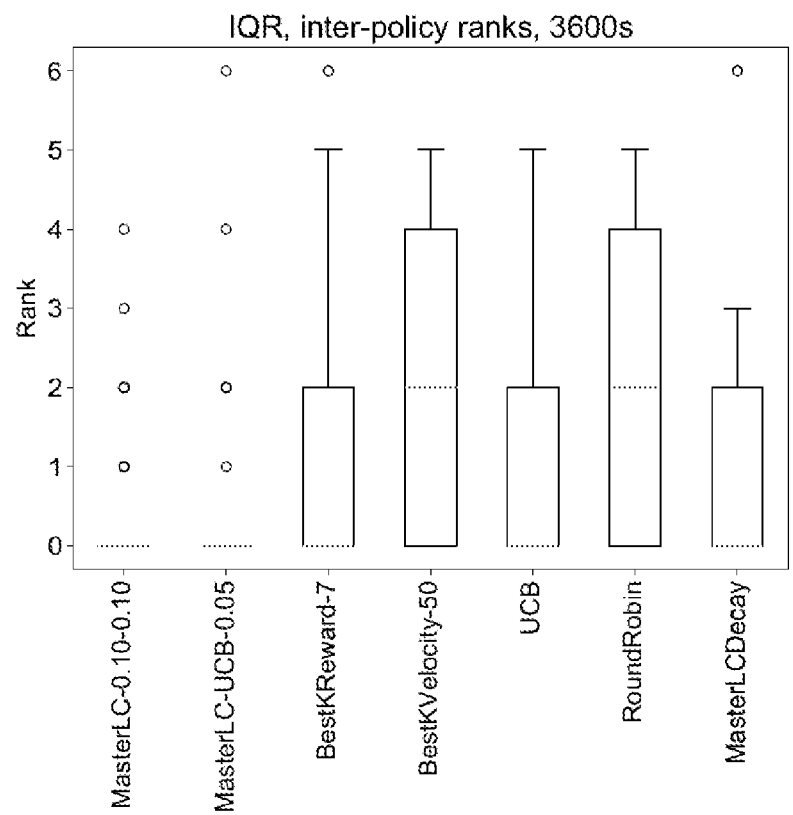
Figure 9E:
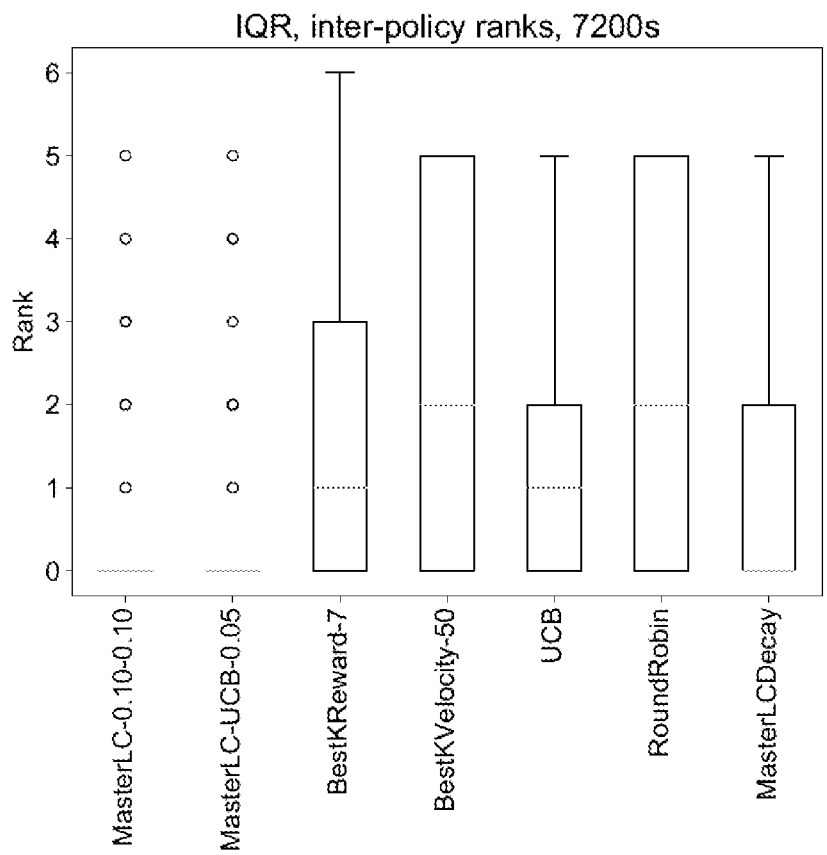
Figure 9F:
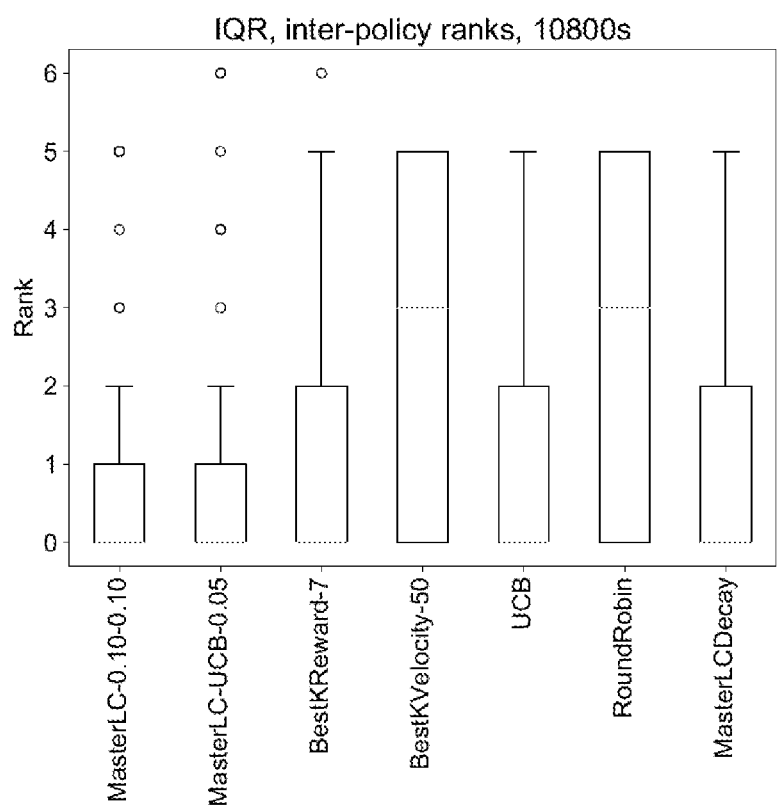
Figure 9G:
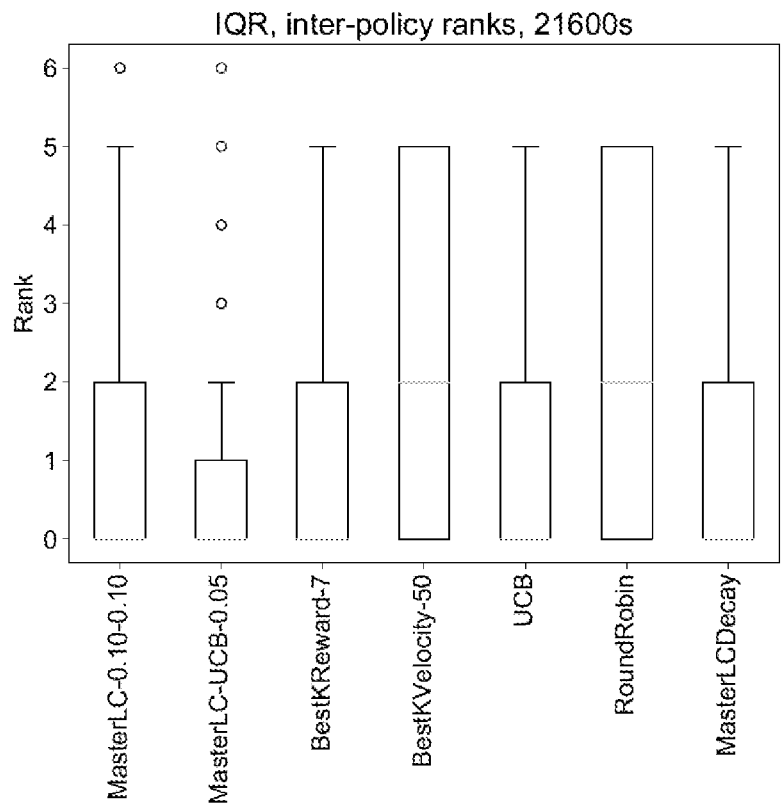
Figure 9H:
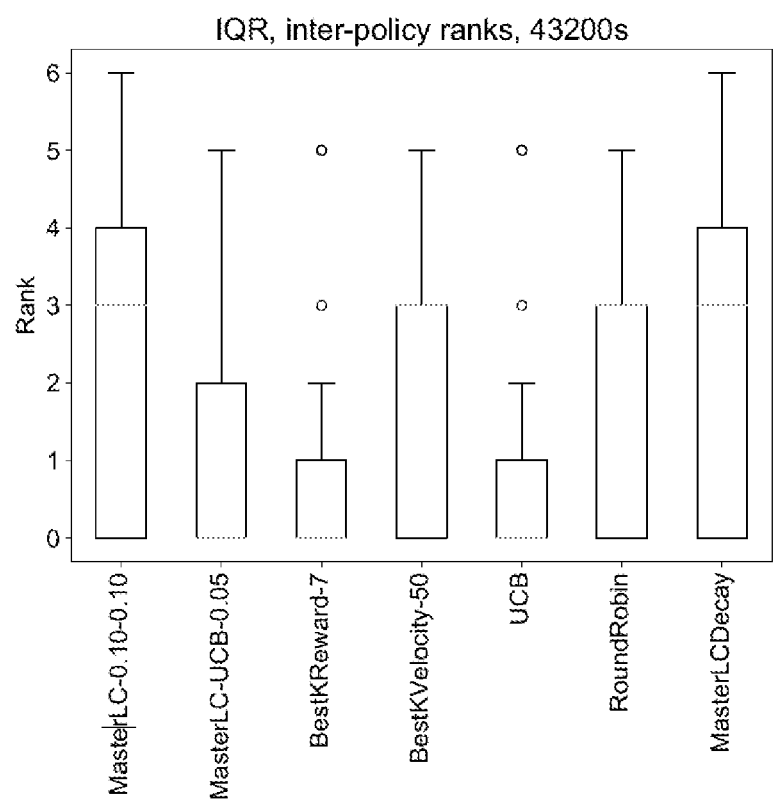

FIGS. 6a, 6b and 6c show selected boxplots of ranks for small datasets for different budgets for inter-policy comparisons. In particular, it can be seen that HAMLET Variants 1 and 3 achieve favorable performances over all experiments.

Similar to FIGS. 4a, 4b and 4c, FIGS. 7a, 7b and 7c confirm that high levels of constant stochasticity, as well as too small levels of stochastic exploration, are detrimental for the performance of Variant 1. The selection of $\epsilon_1$=0.1 and $\epsilon_2$=0.1 was confirmed among the parametrizations.

Similar to FIGS. 5a, 5b, 5c and 5d, FIGS. 8a, 8b, 8c and 8d confirm that medium to large ρ for scaling the UCB exploration bonus is detrimental for the performance of Variant 3. ρ=0.05 was confirmed.

FIGS. 9a, 9b, 9c, 9d, 9e, 9f, 9g and 9h show boxplots of ranks for bigger datasets for all eight budgets. HAMLET Variant 1 (MasterLC-$\epsilon_1$-$\epsilon_2$) and Variant 3 (MasterLC-UCB-I) achieve favorable performance. At higher budgets, BestKRewards-7 and UCB can catch up.

HAMLET Variants 1 and 3 benefit from time awareness and learning curve extrapolation capability. Extrapolation is beneficially encouraged, but tempered since too high levels of stochasticity or exploration bonus reduce the algorithm selection performance (see FIGS. 4a-c, 5a-d, 7a-c and 8a-d). For several low to medium budgets in each experiment, HAMLET Variants 1 and 3 perform better than the competitor policies. For budgets outside of that range, HAMLET Variants 1 and 3 perform at least on par with the BestK-Reward policy.

Figure 10:
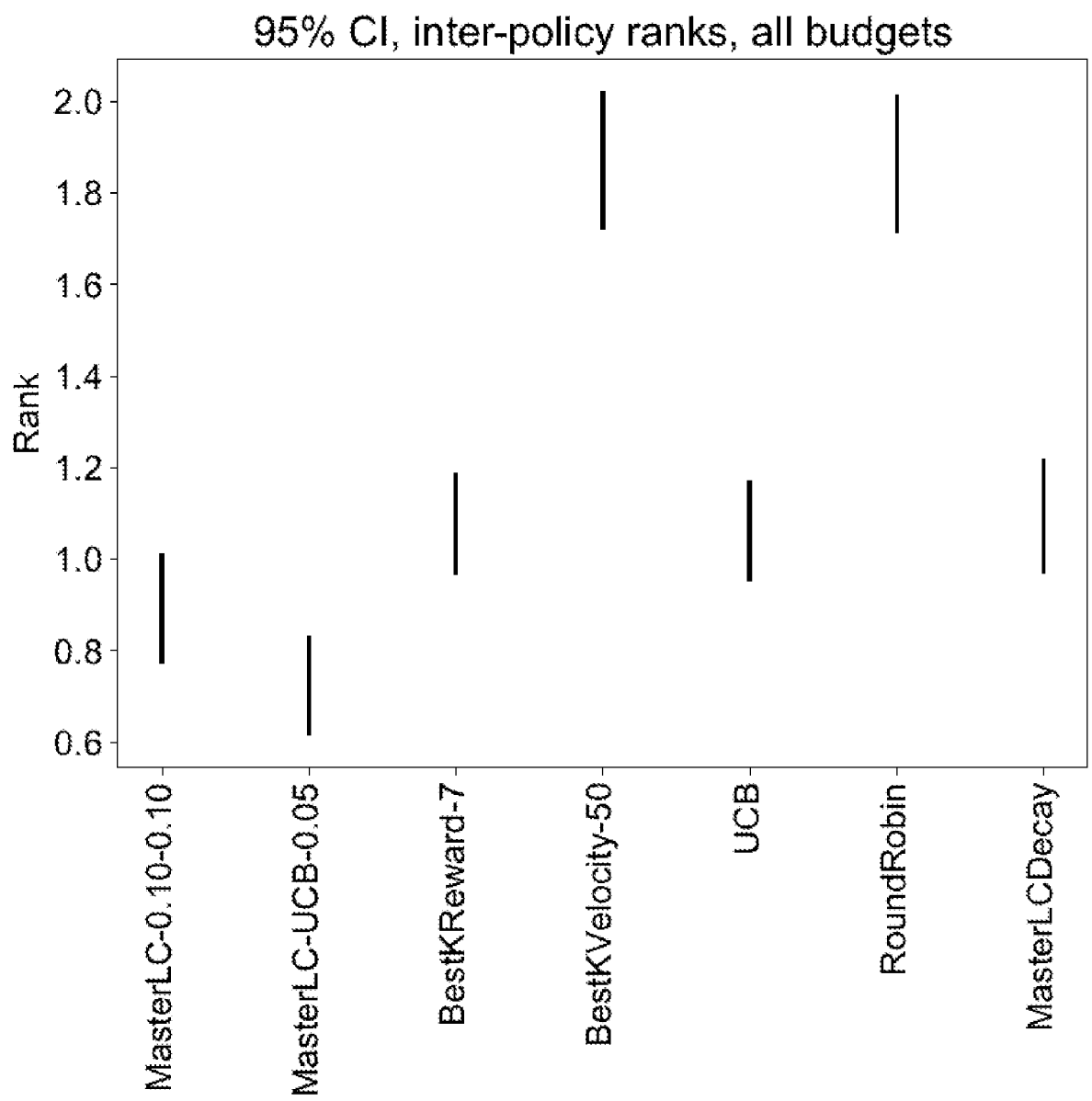
FIG. 10 shows intervals of 95% confidence of the different policies' mean ranks, aggregated over all datasets and budgets.

The boxplots in FIGS. 6a-c and in FIGS. 9a-h indicate that HAMLET variants perform better than the compared-to policies for a range of budgets. FIG. 10 shows the aggregation of all 1,485 runs (99 traces×15 budget levels). Here, HAMLET Variant 3 learning curve extrapolation combined with an uncertainty bonus for exploration in particular achieves a statistically significant better performance at the 95% level than the other policies (except the HAMLET Variant 1), because the respective confidence intervals (CI) do not overlap. Therefore, it can be concluded from the experiments, and in particular, the performance of HAMLET Variant 3, that the inventors' discovery that the combination of learning curve extrapolation and accounting for computation time improves the performance of multi-armed bandits in algorithm selection problems is indeed correct. Considering that the applied learning curve extrapolation technique is straightforward (see Equation (1) above), more sophisticated learning curve techniques can also be applied, which would only increase the relative advantage of HAMLET over alternative policy approaches.

It was also verified that the trends of the results do not change when the different policy groups' best-performing policies are compared against each other for each budget. Finally, it was observed during the experiments that the BestK-Velocity policy usually performs much worse than the BestK-Rewards strategy or the UCB strategy.

In sum, the experiments with a range of bandit policy parametrizations show that even a straightforward approach to extrapolate learning curves is a valuable amendment for the bandit-based algorithm selection problem. Statistical analysis shows that the HAMLET Variants are at least as good as standard bandit approaches, while providing a number of improvements and advantages as detailed herein. Notably, HAMLET Variant 3, which combines learning curve extrapolation with a scaled UCB exploration bonus, performs superior to all non-HAMLET Variants, as shown in FIG. 10 illustrating the intervals of 95% confidence of the different policies' mean ranks, aggregated over all datasets and budgets. Even further performance improvements can be achieved, for example, using more sophisticated learning curve modeling approaches, e.g., BNN-based learning curve predictors, or by integrating meta-learning concepts, e.g., by evolving HAMLET into a contextual bandit.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for automated machine learning, the method comprising:
controlling execution of a plurality of instantiations of different automated machine learning frameworks on a machine learning task each as a separate arm in consideration of available computational resources and time budget, whereby, during the execution by the separate arms, a plurality of machine learning models are trained and performance scores of the plurality of trained machine learning models are computed such that one or more of the plurality of trained machine learning models are selectable for the machine learning task based on the performance scores.

2. The method according to claim 1, wherein the machine learning models are trained using patient health data, physiological measurements, general patient information and lengths of stays of patients as input, and wherein the machine learning task is to predict a length of stay in a hospital for a new or already admitted patient.

3. The method according to claim 1, wherein the machine learning models are trained using medical data, and wherein the machine learning task is to classify a sickness of a patient or an emergency-submittance risk of the patient.

4. The method according to claim 3, further comprising determining a treatment for the patient based on the classification.

5. The method according to claim 1, wherein the machine learning models are trained using medical and/or patient health data, and wherein the machine learning task is an automated healthcare task.

6. The method according to claim 1, wherein the machine learning models are trained using data from sensors measuring traffic, and wherein the machine learning task is to predict traffic demographics.

7. The method according to claim 6, further comprising implementing a dynamic traffic control decision based on the solution.

8. The method according to claim 1, wherein the machine learning models are trained using data from sensors in a building and weather data, and wherein the machine learning task is to predict energy usage of the building.

9. The method according to claim 1, wherein the machine learning models are trained using data from sensors measuring traffic and/or weather, and wherein the machine learning task is to predict air quality.

10. The method according to claim 1, wherein the machine learning models are trained using fundamental data of securities and time series of trading prices, and wherein the machine learning task is to classify securities or predict future security prices.

11. The method according to claim 1, wherein, during the execution of the separate arms, the performance scores are extrapolated for a remainder of the time budget based on achieved performances of respective ones of the arms during a time interval of the execution which is a portion of the time budget, and wherein the computational resources are assigned to the arms during the remainder of the time budget based on the extrapolated performance scores such that at least one of the arms having a higher extrapolated performance score than another one of the arms receives more of the computational resources.

12. The method according to claim 11, wherein the performance scores are extrapolated by fitting a learning curve function to past rewards of the respective ones of the arms and extrapolating the past rewards until an end of the remainder of the time budget.

13. The method according to claim 11, further comprising freezing the execution of at least one of the arms based on the extrapolated performance scores.

14. The method according to claim 1, wherein, during the execution of the separate arms, at least some of the arms are executed by time multiplexing using a selection mechanism to allocate the computational resources to the arms during the time budget.

15. The method according to claim 1, further comprising selecting an ensemble of at least two of the plurality of trained machine learning models having the highest performance scores to perform the machine learning task.

16. The method according to claim 1, wherein each of the arms are executed as a microservice component of a cloud computer system architecture in a docker container which has a container image for a respective one of the automated machine learning frameworks.

17. The method according to claim 1, further comprising receiving the machine learning task and a dataset for the machine learning task from a user, and selecting or implementing at least one of the trained machine learning models to provide a solution to the machine learning task.

18. The method according to claim 1, wherein, during the execution of the separate arms, a learning curve is constructed for each of the arms during a time interval of the execution within the time budget, the performance scores of each of the arms are extrapolated until a remainder of the time budget, and execution of at least some of the arms is frozen or disabled based on the extrapolated performance scores, and wherein the learning curves are constructed based on maximum performance scores achieved by respective ones of the arms during the time interval.

19. A system comprising one or more processors which, alone or in combination, are configured to provide for execution of a method comprising:

controlling execution of a plurality of instantiations of different automated machine learning frameworks on a machine learning task each as a separate arm in consideration of available computational resources and time budget, whereby, during the execution by the separate arms, a plurality of machine learning models are trained and performance scores of the plurality of trained machine learning models are computed such that one or more of the plurality of trained machine learning models are selectable for the machine learning task based on the performance scores.

20. A tangible, non-transitory computer-readable medium having instructions thereon which, upon being executed by one or more processors, alone or in combination, provide for execution of a method comprising:

controlling execution of a plurality of instantiations of different automated machine learning frameworks on a machine learning task each as a separate arm in consideration of available computational resources and time budget, whereby, during the execution by the separate arms, a plurality of machine learning models are trained and performance scores of the plurality of trained machine learning models are computed such that one or more of the plurality of trained machine learning models are selectable for the machine learning task based on the performance scores.

* * * * *